United States Patent
Li et al.

(10) Patent No.: US 12,473,305 B2
(45) Date of Patent: Nov. 18, 2025

(54) PYRAZOLE BORONIC ACID COMPOUND, PHARMACEUTICAL COMPOSITION CONTAINING SAME, AND USES THEREOF

(71) Applicant: BEIJING SONGRUN PHARMACEUTICAL TECHNOLOGY CO., LTD., Beijing (CN)

(72) Inventors: Runtao Li, Beijing (CN); Yuanqiang Wang, Beijing (CN); Liqiang Han, Beijing (CN); Zhuanzhuan Song, Beijing (CN); Zemei Ge, Beijing (CN); Xin Wang, Beijing (CN)

(73) Assignee: BEIJING SONGRUN PHARMACEUTICAL TECHNOLOGY CO., LTD., Beijing (CN)

( * ) Notice: Subject to any disclaimer, the term of this patent is extended or adjusted under 35 U.S.C. 154(b) by 456 days.

(21) Appl. No.: 18/042,150

(22) PCT Filed: Aug. 19, 2021

(86) PCT No.: PCT/CN2021/113533
§ 371 (c)(1),
(2) Date: Feb. 17, 2023

(87) PCT Pub. No.: WO2022/037648
PCT Pub. Date: Feb. 24, 2022

(65) Prior Publication Data
US 2023/0322816 A1    Oct. 12, 2023

(30) Foreign Application Priority Data
Aug. 19, 2020   (CN) .......................... 202010835794.9

(51) Int. Cl.
*C07F 5/02*   (2006.01)
*A61P 35/00*  (2006.01)

(52) U.S. Cl.
CPC .............. *C07F 5/025* (2013.01); *A61P 35/00* (2018.01)

(58) Field of Classification Search
CPC ................................ C07F 5/025; A61P 35/00
See application file for complete search history.

(56) References Cited

U.S. PATENT DOCUMENTS 5,563,127 A   10/1996   Amparo et al.

FOREIGN PATENT DOCUMENTS

| CN | 104321060 A | 1/2015 |
| CN | 105622658 A | 6/2016 |
| CN | 107108660 A | 8/2017 |
| WO | 2020020858 A1 | 1/2020 |

OTHER PUBLICATIONS

Micale et al, Development of peptidomimetic boronates as proteasome inhibitors, 2013, European Journal of Medicinal Chemistry, 64, pp. 23-34. (Year: 2013).*
Written Opinion and International Search Report dated Nov. 25, 2021 issued in International Patent Application No. PCT/CN2021/113533.

* cited by examiner

*Primary Examiner* — Trevor Love
(74) *Attorney, Agent, or Firm* — McDonnell Boehnen Hulbert & Berghoff LLP

(57) ABSTRACT

The present application relates to a pyrazole boronic acid compound represented by the following formula I, pharmaceutically acceptable salts or stereoisomers thereof, a pharmaceutical composition containing same, and uses thereof. The compound, the pharmaceutically acceptable salts or stereoisomers thereof and the pharmaceutical composition containing same can be used for preparing proteasome inhibitors.

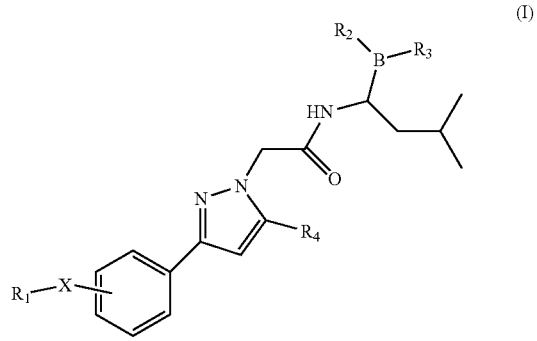

15 Claims, No Drawings

PYRAZOLE BORONIC ACID COMPOUND, PHARMACEUTICAL COMPOSITION CONTAINING SAME, AND USES THEREOF

CROSS-REFERENCE

This application is a section 371 U.S. national phase of PCT/CN2021/113533, filed Aug. 19, 2021, which claims priority from Chinese patent application no. 202010835794.9, filed Aug. 19, 2020, both which are incorporated by reference in its entirety.

TECHNICAL FIELD

The present application belongs to the pharmaceutical field. Specifically, it relates to pyrazole boric acid compound represented by formula I, the pharmaceutically acceptable salt or the stereoisomer thereof, and the pharmaceutical compositions comprising the same, and the use thereof in the preparation of a proteasome inhibitor.

BACKGROUND

As the main site for hydrolysis of intracellular proteins, proteasome plays an important role in cell cycle regulation, cell stress reaction and immune response. Therefore, proteasome has become an ideal target for the treatment of a variety of diseases, including cancer, plasmodiosis, asthma and so on.

At present, there are many proteasome inhibitors on the market, such as bortezomib, MLN9708 (trade name Ninlaro; 31), carfilzomib and NPI0052 (trade name Marizomib), etc. However, the disadvantages of the existing proteasome inhibitors, such as poor biological selectivity, poor stability in vivo and in vitro, poor solid tumor inhibition effect, and large toxic and side effects, limit their clinical application.

SUMMARY OF THE INVENTION

The present application relates to a compound represented by formula I, a pharmaceutically acceptable salt or a stereoisomer thereof:

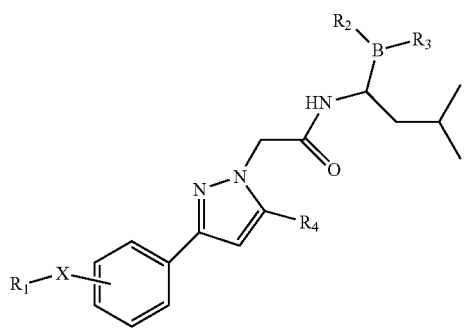

(I)

wherein $R_1$ is selected from H, phenyl, $C_{1-4}$ alkyl, a 5-membered or 6-membered heterocyclyl containing 1-3 heteroatoms selected from N or O or S, or

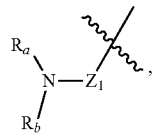

the phenyl is optionally substituted by halogen, $C_{1-4}$ haloalkyl and/or $C_{1-4}$ alkyl; and the $Z_1$ is a $C_{1-10}$ hydrocarbon group or a heterohydrocarbon group obtained by substituting one or more carbon atoms in $C_{1-10}$ hydrocarbon group with a heteroatom selected from O, S or N; and the $R_a$ and $R_b$ are each independently selected from H or $C_{1-4}$ alkyl, or $R_a$ and $R_b$ form a 5-membered to 10-membered saturated heterocyclyl with the N atom to which they connect, the 5-membered to 10-membered saturated heterocyclyl can contain 0-3 heteroatoms selected from N, O or S in addition to the N atom, and the 5-membered to 10-membered saturated heterocyclyl is optionally substituted by $C_{1-4}$ alkyl, phenyl, or a 5-membered or 6-membered heterocyclyl containing 1-3 heteroatoms;

$R_2$ and $R_3$ are each independently selected from OH, $C_{1-4}$ alkyl or $O(O)C_{1-4}$ alkyl, or $R_2$ and $R_3$ form a 4 to 15-membered ring

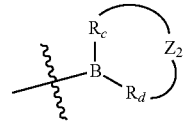

with the B atom to which they connect; the $R_c$ and $R_d$ are each independently selected from O, S, NH, $NR_e$, —CO, —NHCO, —$NR_fCO$, —$OS(O)_2$, —$NHS(O)_2$ or —$NR_g$—$SO_2$; and the $Z_2$ is a $C_{1-10}$ hydrocarbon group, or a heterohydrocarbon group obtained by substituting one or more carbon atoms in $C_{1-10}$ hydrocarbon group with a heteroatom selected from O, S or N, or one or more $R_c$ and/or $R_d$;

the $R_e$, $R_f$ and $R_g$ are each independently selected from halogen, $C_{1-10}$ alkyl, $C_{1-10}$ alkoxy, or $C_{1-10}$ haloalkyl;

$R_4$ is selected from $C_{1-4}$ alkyl, phenyl, or a 5-membered or 6-membered heterocyclyl containing 1-3 heteroatoms selected from N or O or S, and the phenyl is optionally substituted by halogen, cyano, $C_{1-4}$ alkyl, $C_{1-4}$ alkoxy, phenyl, $C_{1-4}$ alkylsulfonyl and/or phenyl $C_{1-4}$ alkoxy;

X is selected from NH, O, S, —$OS(O)_2$—, or —$NHS(O)_2$—.

In another aspect, the present application relates to a pharmaceutical composition comprising the compound represented by formula I, the pharmaceutically acceptable salt or the stereoisomer thereof mentioned above, and a pharmaceutically acceptable excipient.

In another aspect, the present application relates to the use of the compound represented by formula I, the pharmaceutically acceptable salt or the stereoisomer thereof mentioned above, or the pharmaceutical composition mentioned above in the preparation of a proteasome inhibitor. Preferably, the proteasome inhibitor can be used in treating or alleviating a proteasome-related disease, such as tumor, plasmodium infection, asthma or Alzheimer's disease. Alternatively, another aspect of the present application relates to a method of treating or alleviating a proteasome-related disease comprising administering to a subject in need thereof a therapeutically effective amount of the compound represented by formula I, the pharmaceutically acceptable salt or the stereoisomer thereof mentioned above, or the pharmaceutical composition mentioned above. Alternatively, another aspect of the present application relates to a compound represented by formula I, a pharmaceutically acceptable salt or a stereoisomer thereof mentioned above, or a pharmaceutical composition mentioned above for use in treating or alleviating a proteasome-related disease.

EMBODIMENTS OF THE INVENTION

Those skilled in the art can understand that the following embodiments are only given for example purposes and are not intended to limit the protection scope of the application in any way. The present application can cover any combination of the following multiple embodiments or any combination of multiple features of different embodiments.

The term "$C_{m-n}$" herein refers to m to n carbon atoms in the moiety modified by the term (n is greater than m, and both are integers). For example, $C_{1-10}$ indicates that the moiety modified thereby has 1-10 carbon atoms, such as 1 carbon atom, 2 carbon atoms, 3 carbon atoms, 4 carbon atoms, 5 carbon atoms, 6 carbon atoms, 7 carbon atoms, 8 carbon atoms, 9 carbon atoms or 10 carbon atoms.

Unless otherwise stated, the term "hydrocarbon group" herein refers to a chain-like group consisting of C and H, which contains straight or branched, saturated or unsaturated hydrocarbon group, including but not limited to $C_{1-10}$, $C_{1-9}$, $C_{1-8}$, $C_{1-7}$, $C_{1-6}$, $C_{1-5}$, $C_{1-4}$, $C_{1-3}$, $C_{1-2}$ and $C_1$ hydrocarbon group. Unless otherwise stated, the term "heterohydrocarbon group" herein refers to a chain-like group formed by substituting one or more (such as 2, 3, 4, 5, 6, 7, 8, 9, 10, etc.) carbon atoms, such as 1-3 or 1-5 or 1-10 carbon atoms in the chain hydrocarbon groups with a heteroatom selected from N, O or S.

Unless otherwise stated, the term "alkyl" used herein refers to a saturated hydrocarbon group consisting only of carbon atoms and hydrogen atoms, including but not limited to $C_{1-10}$ alkyl, $C_{1-9}$ alkyl, $C_{1-8}$ alkyl, $C_{1-7}$ alkyl, $C_{1-6}$ alkyl, $C_{1-5}$ alkyl, $C_{1-4}$ alkyl, $C_{1-3}$ alkyl, $C_{1-2}$ alkyl and $C_1$ alkyl. As a non-limiting example of alkyl, the following linear or branched saturated hydrocarbon groups can be listed: methyl, ethyl, n-propyl, isopropyl, n-butyl, isobutyl, sec-butyl, tert-butyl, n-amyl and its other seven isomers, n-hexyl and its other sixteen isomers. For example, $C_{1-7}$ alkyl includes methyl, ethyl, propyl, butyl, amyl, hexyl, heptyl and all their isomers.

Unless otherwise stated, the term "heterocyclyl" herein includes aliphatic heterocyclyl and aromatic heterocyclyl, refers to a saturated or unsaturated ring system consisting of carbon atom(s) and 1-3 heteroatoms independently selected from N, O or S, and can be substituted or unsubstituted. Unless otherwise stated, the term "saturated heterocyclyl" herein refers to a heterocyclyl consisting of carbon atom(s) and 1-3 heteroatoms independently selected from N, O or S, and can be substituted or unsubstituted. As a non-limiting example of heterocyclyl, pyrrolyl, thienyl, thiazolyl, imidazolyl, pyrazinyl, piperidinyl, piperazinyl, pyrimidinyl, pyrrolidinyl, morpholinyl, furanyl, tetrahydrofuranyl, tetrahydropyranyl, oxirane group, pyranyl, pyridyl or tetrahydropyridinyl can be listed, but not limited thereto.

Unless otherwise stated, the term "alkoxy" used herein refers to a group in which an oxygen atom is connected with the above-mentioned alkyl, and that is connected to the rest of a molecule through the oxygen atom in a single bond, which covers various possible geometric isomeric groups and stereoisomeric groups. As a non-limiting example of alkoxy, methoxy, ethoxy, n-propyloxy, isopropoxy, n-butoxy, isobutyloxy, sec-butyloxy, tert-butoxy, n-pentoxy and its other seven isomers, n-hexoxy and its other sixteen isomers can be listed.

Unless otherwise stated, the term "halogen" used herein refers to fluorine, chlorine, bromine or iodine. Unless otherwise stated, the term "haloalkyl" used herein refers to the above-defined alkyl substituted by one or more, preferably 1-5 (such as 1, 2, 3, 4 or 5) halogen atoms. Haloalkyl includes monohaloalkyl, dihaloalkyl, trihaloalkyl, and perhalogeno-alkyl, such as chloromethyl, dichloromethyl, difluoromethyl, dibromomethyl, trifluoromethyl, 2,2,2-trifluoroethyl, perfluoroethyl, 2,2,2-trifluoro-1,1-dichloroethyl, etc.

Unless otherwise stated, the term "pharmaceutically acceptable" used herein refers to those compounds, materials, compositions and/or dosage forms that are suitable for contact with human and animal tissues without excessive toxicity, irritation, allergic reaction or other problems or complications and are commensurate with reasonable benefit/risk ratio within the scope of reasonable medical judgment. For example, the term "pharmaceutically acceptable salt" used herein refers to an acid addition salt or base addition salt formed by the compound represented by formula I and the pharmaceutically acceptable free acid or base. The acid addition salt is obtained from the following acids: hydrochloric acid, nitric acid, phosphoric acid, sulfuric acid, hydrobromic acid, hydroiodic acid, nitrous acid, phosphorous acid, acetic acid, benzoic acid, citric acid, lactic acid, maleic acid, gluconic acid, methanesulfonic acid, benzenesulfonic acid, p-toluenesulfonic acid, tartaric acid, fumaric acid, malic acid, oxalic acid, succinic acid, etc. The base addition salt includes sodium salt, potassium salt, calcium salt, ammonium salt, or magnesium salt.

Unless otherwise stated, wedge solid and dashed bonds (🖋 and ⋯⋰) are used herein to indicate the absolute configuration of a stereoscopic center. Unless otherwise stated, the stereoisomer mentioned herein includes geometric isomer and enantiomer, all of which are within the scope of the application.

Unless otherwise stated, the term "optional" herein refers to the presence or absence, occurrence or non-occurrence of the object or event modified thereby. For example, "optionally substituted" of a group means that the group can be substituted or unsubstituted.

In one embodiment, the present application relates to a compound represented by formula I, a pharmaceutically acceptable salt or a stereoisomer thereof:

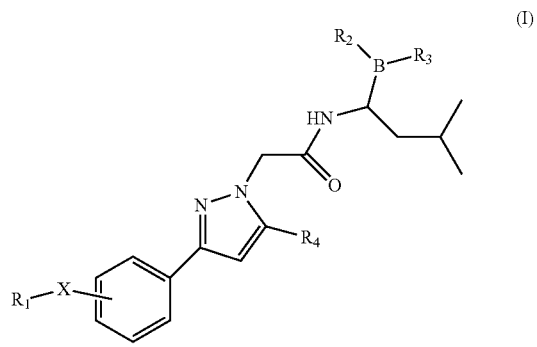

(I)

wherein $R_1$ is selected from H, phenyl, $C_{1-4}$ alkyl, a 5-membered or 6-membered heterocyclyl containing 1-3 heteroatoms selected from N or O or S, or

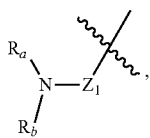

the phenyl is optionally substituted by halogen, $C_{1-4}$ haloalkyl and/or $C_{1-4}$ alkyl; and the $Z_1$ is a $C_{1-10}$ hydrocarbon group or a heterohydrocarbon group obtained by substituting one or more carbon atoms in $C_{1-10}$ hydrocarbon group with a heteroatom selected from O, S or N; and the $R_a$ and $R_b$ are each independently selected from H or $C_{1-4}$ alkyl, or $R_a$ and $R_b$ form a 5-membered to 10-membered saturated heterocyclyl with the N atom to which they connect, the 5-membered to 10-membered saturated heterocyclyl can contain 0-3 heteroatoms selected from N, O or S in addition to the N atom, and the 5-membered to 10-membered saturated heterocyclyl is optionally substituted by $C_{1-4}$ alkyl, phenyl, or a 5-membered or 6-membered heterocyclyl containing 1-3 heteroatoms;

$R_2$ and $R_3$ are each independently selected from OH, $C_{1-4}$ alkyl or $O(O)C_{1-4}$ alkyl, or $R_2$ and $R_3$ form a 4 to 15-membered ring

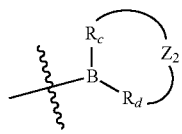

with the B atom to which they connect; the $R_c$ and $R_d$ are each independently selected from O, S, NH, $NR_e$, —CO, —NHCO, —$NR_fCO$, —$OS(O)_2$, —$NHS(O)_2$ or —$NR_g$—$SO_2$; and the $Z_2$ is a $C_{1-10}$ hydrocarbon group, or a heterohydrocarbon group obtained by substituting one or more carbon atoms in $C_{1-10}$ hydrocarbon group with a heteroatom selected from O, S or N, or one or more $R_c$ and/or $R_d$;

the $R_e$, $R_f$ and $R_g$ are each independently selected from halogen, $C_{1-10}$ alkyl, $C_{1-10}$ alkoxy, or $C_{1-10}$ haloalkyl;

$R_4$ is selected from $C_{1-4}$ alkyl, phenyl, or a 5-membered or 6-membered heterocyclyl containing 1-3 heteroatoms selected from N or O or S, and the phenyl is optionally substituted by halogen, cyano, $C_{1-4}$ alkyl, $C_{1-4}$ alkoxy, phenyl, $C_{1-4}$ alkylsulfonyl and/or phenyl $C_{1-4}$ alkoxy;

X is selected from NH, O, S, —$OS(O)_2$—, or —$NHS(O)_2$—.

In some embodiments, $R_1$ is selected from H, phenyl, halogenated phenyl, $C_{1-4}$ haloalkyl phenyl, $C_{1-4}$ alkyl phenyl, a 5-membered or 6-membered unsaturated heterocyclyl containing 1-3 heteroatoms selected from N or O or S, or

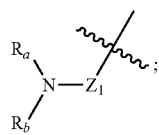

the $Z_1$ is $C_{1-10}$ alkyl; the $R_a$ and $R_b$ are each independently selected from $C_{1-4}$ alkyl, or the $R_a$ and $R_b$ form 5-membered to 7-membered saturated heterocyclyl with the N atom to which they connect, and the 5-membered to 7-membered saturated heterocyclyl is optionally substituted by $C_{1-4}$ alkyl or phenyl.

In some embodiments, $R_1$ is selected from H, phenyl, halogenated phenyl, $C_{1-4}$ haloalkyl phenyl, and $C_{1-4}$ alkyl phenyl,

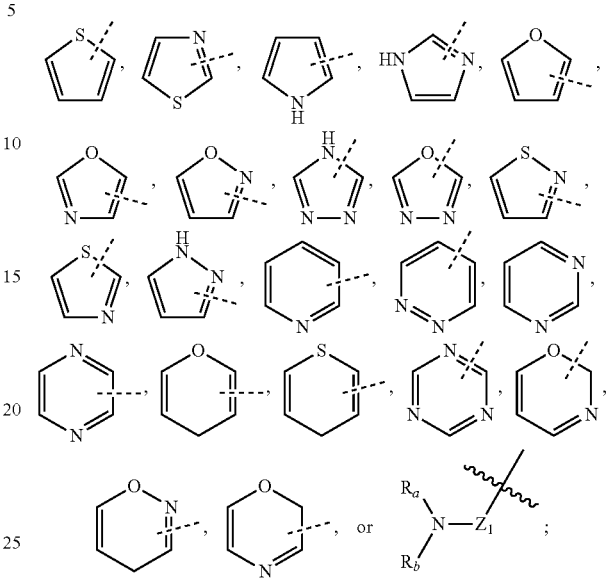

the $Z_1$ is $C_{1-6}$ alkyl; the $R_a$ and $R_b$ are each independently selected from $C_{1-4}$ alkyl group, or the $R_a$ and $R_b$ form a 5-membered or 6-membered saturated heterocyclyl with the N atom to which they connect, and the 5-membered or 6-membered saturated heterocyclyl is optionally substituted by $C_{1-4}$ alkyl or phenyl.

In some embodiments, $R_1$ is selected from H, $C_{1-4}$ haloalkyl phenyl, fluorophenyl, chlorophenyl, bromophenyl, $C_{1-4}$ alkyl phenyl,

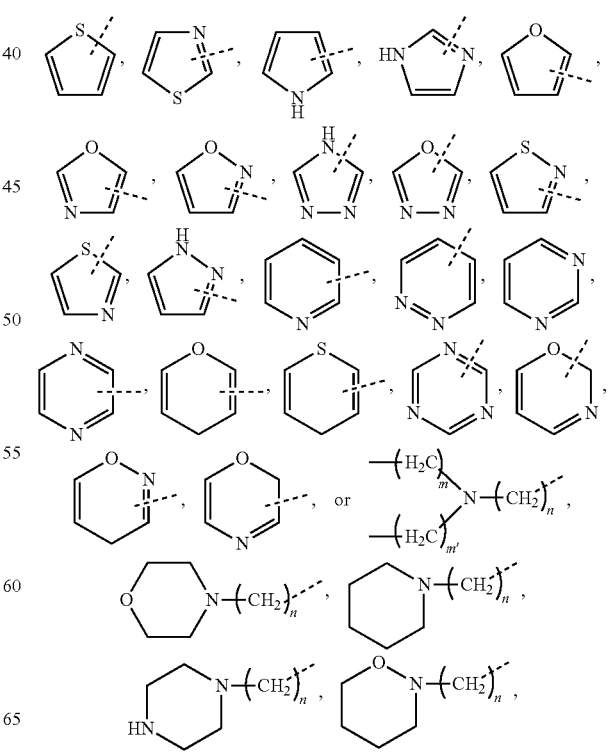

-continued

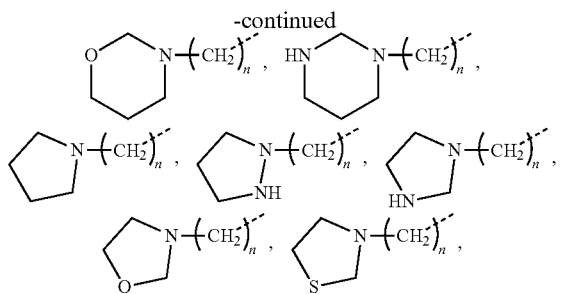

n is an integer selected from 1-6, m and m' are the same or different and are each independently an integer selected from 0-3; and

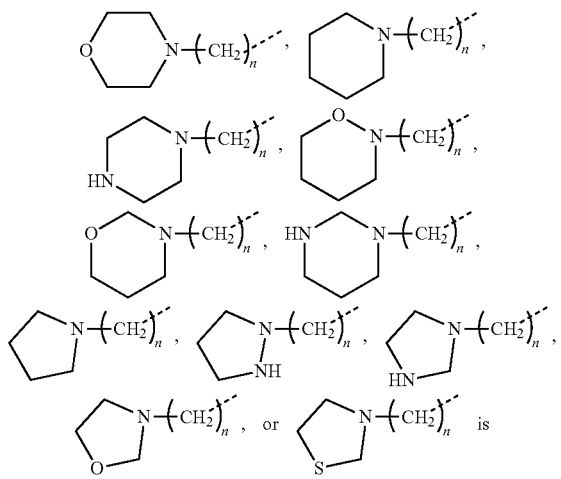

optionally substituted by $C_{1-4}$ alkyl or phenyl.

In some embodiments, $R_2$ and $R_3$ are each independently selected from OH, $C_{1-3}$ alkyl or $O(O)C_{1-3}$ alkyl, or $R_2$ and $R_3$ form a 6 to 10-membered ring

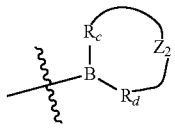

with the B atom to which they connect; the $R_c$ and $R_d$ are each independently selected from O, S, —CO or —OS(O)$_2$; and the $Z_2$ is a $C_{1-5}$ hydrocarbon group, or a heterohydrocarbon group obtained by substituting 1-3 carbon atoms in the $C_{1-5}$ hydrocarbon group with a heteroatom selected from O, S or N.

In some embodiments, $R_2$ and $R_3$ are each independently selected from OH, $C_{1-3}$ alkyl or $O(O)C_{1-3}$ alkyl, or $R_2$ and $R_3$ form the follows with the connected B atoms:

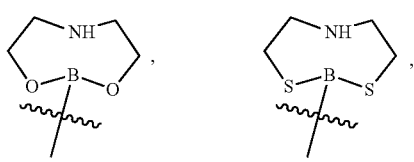

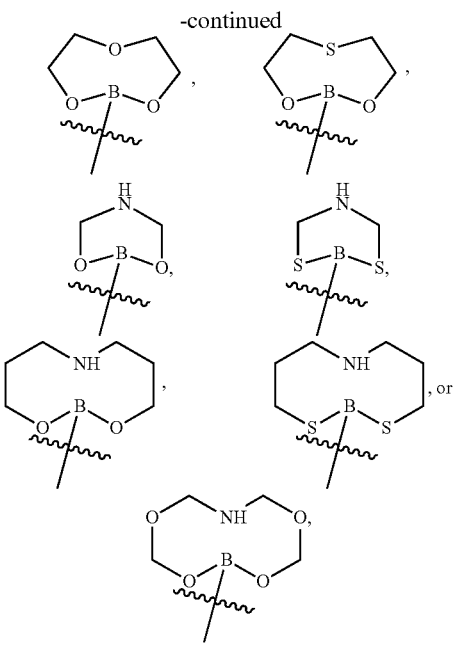

In some embodiments, $R_4$ is selected from $C_{1-4}$ alkyl, phenyl, halogenated phenyl, $C_{1-4}$ haloalkyl phenyl, $C_{1-4}$ alkyl phenyl, cyanophenyl, $C_{1-4}$ alkoxyphenyl, biphenyl, $C_{1-4}$ alkylsulfonyl phenyl, phenyl $C_{1-4}$ alkoxyphenyl, or a 5-membered or 6-membered unsaturated heterocyclyl containing 1-3 heteroatoms selected from N or O or S.

In some embodiments, $R_4$ is selected from $C_{1-4}$ alkyl, phenyl, fluorophenyl, chlorophenyl, bromophenyl, $C_{1-4}$ fluoroalkyl phenyl, $C_{1-4}$ chloroalkyl phenyl, $C_{1-4}$ bromoalkyl phenyl, $C_{1-4}$ alkyl phenyl, cyanophenyl, $C_{1-4}$ alkoxyphenyl, biphenyl, $C_{1-4}$ alkylsulfonyl phenyl, phenyl $C_{1-4}$ alkoxyphenyl, or a 5-membered or 6-membered unsaturated heterocyclyl containing 1-2 heteroatoms selected from N or O or S.

In some embodiments, $R_4$ is selected from $C_{1-4}$ alkyl, phenyl, fluorophenyl, chlorophenyl, bromophenyl, $C_{1-4}$ fluoroalkyl phenyl, $C_{1-4}$ chloroalkyl phenyl, $C_{1-4}$ bromoalkyl phenyl, $C_{1-4}$ alkyl phenyl, cyanophenyl, $C_{1-4}$ alkoxyphenyl, biphenyl, $C_{1-4}$ alkylsulfonyl phenyl, phenyl $C_{1-4}$ alkoxyphenyl,

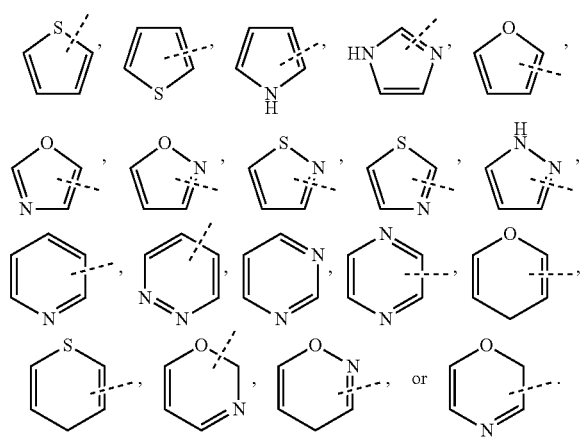

In some embodiments, $R_1$ is selected from H, fluoromethylphenyl, chloromethylphenyl, bromomethylphenyl, fluoroethylphenyl, chloroethylphenyl, chloroethylphenyl, bromoethylphenyl, fluoropropylphenyl, chloropropylphenyl, bromopropylphenyl, fluorophenyl, chlorophenyl, bromophenyl, methylphenyl, ethylphenyl, propylphenyl, phenyl, ethoxyphenyl, propoxyphenyl, biphenyl, methylsulfonylphenyl, ethylsulfonylphenyl, propylsulfonylphenyl, phenylmethoxyphenyl, phenylethoxyphenyl, phenylpropoxyphenyl,

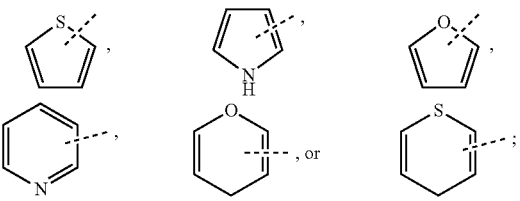

X is selected from O, S, —OS(O)$_2$—, or —NHS(O)$_2$—.

In some embodiments, among the compounds represented by the above formula I, the pharmaceutically acceptable salts or the stereoisomers thereof involved in this application, the compounds are selected from:

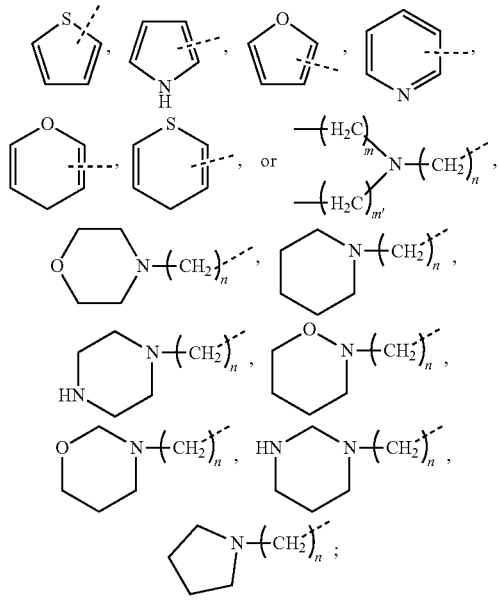

n is an integer selected from 1-5, m and m' are the same or different and are each independently an integer selected from 0-2; and

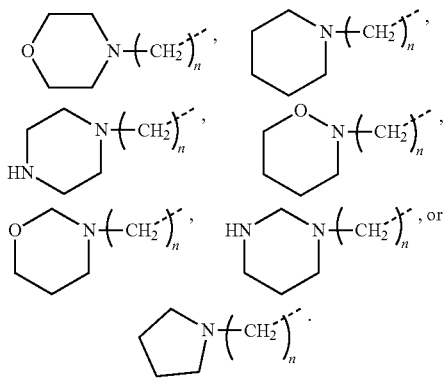

is optionally substituted by methyl, ethyl, propyl or phenyl;
R$_2$ and R$_3$ are each independently selected from OH, or R$_2$ and R$_3$ form

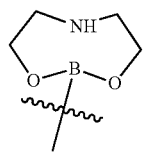 [SMILES: *B1OCCNCCO1]

with the B atom to which they connect;
R$_4$ is selected from methyl, ethyl, propyl, phenyl, fluorophenyl, chlorophenyl, bromophenyl, cyanophenyl, methylphenyl, ethylphenyl, propylphenyl, methoxy- (1) (R)-(3-methyl-1-(2-(5-phenyl-3-(2-(((3-(trifluoromethyl)phenyl)sulfonyl)oxy)phenyl)-1H-pyrazol-1-yl)acetamido)butyl)boronic acid;
(2) (R)-(3-methyl-1-(2-(5-phenyl-3-(2-(((4-(trifluoromethyl)phenyl)sulfonyl)oxy)phenyl)-1H-pyrazol-1-yl)acetamido)butyl)boronic acid;
(3) (R)-(3-methyl-1-(2-(5-phenyl-3-(2-(((2-(trifluoromethyl)phenyl)sulfonyl)oxy)phenyl)-1H-pyrazol-1-yl)acetamido)butyl)boronic acid;
(4) (R)-(1-(2-(3-(2-(((3-fluorophenyl)sulfonyl)oxy)phenyl)-5-phenyl-1H-pyrazol-1-yl)-acetamido)-3-methylbutyl)boronic acid;
(5) (R)-(1-(2-(3-(2-(((3-chlorophenyl)sulfonyl)oxy)phenyl)-5-phenyl-1H-pyrazol-1-yl)-acetamido)-3-methylbutyl)boronic acid;
(6) (R)-(1-(2-(3-(2-(((3-bromophenyl)sulfonyl)oxy)phenyl)-5-phenyl-1H-pyrazol-1-yl)-acetamido)-3-methylbutyl)boronic acid;
(7) (R)-(1-(2-(3-(2-(((2,5-dichlorophenyl)sulfonyl)oxy)phenyl)-5-phenyl-1H-pyrazol-1-yl)-acetamido)-3-methylbutyl)boronic acid;
(8) (R)-(3-methyl-1-(2-(5-phenyl-3-(2-((m-tolylsulfonyl)oxy)phenyl)-1H-pyrazol-1-yl)acetamido)butyl)boronic acid;
(9) (R)-(3-methyl-1-(2-(5-phenyl-3-(2-((thiophen-2-ylsulfonyl)oxy)phenyl)-1H-pyrazol-1-yl)acetamido)butyl)boronic acid;
(10) (R)-(1-(2-(3-(2-((pyridin-2-ylsulfonyl)oxy)phenyl)-5-phenyl-1H-pyrazol-1-yl)acetamido)-3-methylbutyl)boronic acid;
(11) (R)-(3-methyl-1-(2-(5-phenyl-3-(3-(((3-(trifluoromethyl)phenyl)sulfonyl)oxy)phenyl)-1H-pyrazol-1-yl)acetamido)butyl)boronic acid;
(12) (R)-(3-methyl-1-(2-(5-phenyl-3-(4-(((3-(trifluoromethyl)phenyl)sulfonyl)oxy)phenyl)-1H-pyrazol-1-yl)acetamido)butyl)boronic acid;
(13) (R)-(1-(2-(5-(4-bromophenyl)-3-(2-(((3-(trifluoromethyl)phenyl)sulfonyl)oxy)phenyl)-1H-pyrazol-1-yl)acetamido)-3-methylbutyl)boronic acid;
(14) (R)-(1-(2-(5-(3-bromophenyl)-3-(2-(((3-(trifluoromethyl)phenyl)sulfonyl)oxy)phenyl)-1H-pyrazol-1-yl)acetamido)-3-methylbutyl)boronic acid;
(15) (R)-(1-(2-(5-(2-bromophenyl)-3-(2-(((3-trifluoromethylphenyl)sulfonyl)oxy)phenyl)-1H-pyrazol-1-yl)acetamido)isobutyl)boronic acid;

(16) (R)-(1-(2-(5-(4-fluorophenyl)-3-(2-(((3-(trifluoromethyl)phenyl)sulfonyl)oxy)phenyl)-1H-pyrazol-1-yl)acetamido)-3-methylbutyl)boronic acid;

(17) (R)-(1-(2-(5-(4-chlorophenyl)-3-(2-(((3-(trifluoromethyl)phenyl)sulfonyl)oxy)phenyl)-1H-pyrazol-1-yl)acetamido)-3-methylbutyl)boronic acid;

(18) (R)-(1-(2-(5-(4-cyanophenyl)-3-(2-(((3-(trifluoromethyl)phenyl)sulfonyl)oxy)phenyl)-1H-pyrazol-1-yl)acetamido)-3-methylbutyl)boronic acid;

(19) (R)-(1-(2-(5-(4-(methylsulfonyl)phenyl)-3-(2-(((3-(trifluoromethyl)phenyl)sulfonyl)oxy)phenyl)-1H-pyrazol-1-yl)acetamido)-3-methylbutyl)boronic acid;

(20) (R)-(1-(2-(5-(4-methyl-phenyl)-3-(2-(((3-trifluoromethylphenyl)sulfonyl)oxy)phenyl)-1H-pyrazol-1-yl)acetamido)isobutyl)boronic acid;

(21) (R)-(1-(2-(5-(4-methoxyphenyl)-3-(2-(((3-(trifluoromethyl)phenyl)sulfonyl)oxy)phenyl)-1H-pyrazol-1-yl)acetamido)-3-methylbutyl)boronic acid;

(22) (R)-(1-(2-(5-([1,1'-biphenyl]-4-yl)-3-(2-(((3-(trifluoromethyl)phenyl)sulfonyl)oxy)phenyl)-1H-pyrazol-1-yl)acetamido)-3-methylbutyl)boronic acid;

(23) (R)-(1-(2-(5-(4-(benzyloxy)phenyl)-3-(2-(((3-(trifluoromethyl)phenyl)sulfonyl)oxy)phenyl)-1H-pyrazol-1-yl)acetamido)-3-methylbutyl)boronic acid;

(24) (R)-(1-(2-(5-(furan-2-yl)-3-(2-(((3-(trifluoromethyl)phenyl)sulfonyl)oxy)phenyl)-1H-pyrazol-1-yl)acetamido)-3-methylbutyl)boronic acid;

(25) (R)-(3-methyl-1-(2-(5-(thiophen-2-yl)-3-(2-(((3-(trifluoromethyl)phenyl)sulfonyl)oxy)phenyl)-1H-pyrazol-1-yl)acetamido)butyl)boronic acid;

(26) (R)-(3-methyl-1-(2-(5-methyl-3-(3-(((3-trifluoromethylphenyl)sulfonamide)phenyl)-1H-pyrazol-1-yl)acetamido)isobutyl)boronic acid;

(27) (R)-(1-(2-(3-(3-hydroxyphenyl)-5-phenyl-1H-pyrazol-1-yl)acetamido)3-methylbutyl)boronic acid;

(28) (R)-(3-methyl-1-(2-(5-phenyl-3-(3-((3-(trifluoromethyl)phenyl)sulfonyl)oxy)phenyl)-1H-pyrazol-1-yl)acetamido)butyl)boronic acid;

(29) (R)-(1-(2-(3-(3-(2-(dimethylamino)ethoxy)phenyl)-5-phenyl-1H-pyrazol-1-yl)acetamido)-3-methylbutyl)boronic acid hydrochloride;

(30) (R)-(3-methyl-1-(2-(3-(3-(2-morpholinoethoxy)phenyl)-5-phenyl-1H-pyrazol-1-yl)-acetamido)butyl)boronic acid hydrochloride;

(31) (R)-(3-methyl-1-(2-(3-(3-(3-morpholinopropoxy)phenyl)-5-phenyl-1H-pyrazol-1-yl)acetamido)butyl)boronic acid hydrochloride;

(32) (R)-(1-(2-(3-(N,N-diethylethoxy)phenyl)-5-phenyl-1H-pyrazol-1-yl)acetamido)isobutyl)boronic acid hydrochloride;

(33) (R)-(3-methyl-1-(2-(5-phenyl-3-(3-(2-(pyrrolidin-1-yl)ethoxy)phenyl)-1H-pyrazol-1-yl)acetamido)isobutyl)boronic acid hydrochloride;

(34) (R)-(3-methyl-1-(2-(5-phenyl-3-(3-(2-(piperidin-1-yl)ethoxy)phenyl)-1H-pyrazol-1-yl)acetamido)isobutyl)boronic acid hydrochloride;

(35) (R)-(3-methyl-1-(2-(3-(3-(2-(4-methylpiperazin-1-yl)ethoxy)phenyl)phenyl)-5-phenyl-1H-pyrazol-1-yl)acetamido)butyl)boronic acid hydrochloride;

(36) ((1R)-1-(2-(3-(3-(2-(2,6-dimethylmorpholino)ethoxy)phenyl)-5-phenyl-1H-pyrazol-1-yl)acetamido)-3-methylbutyl)boronic acid hydrochloride;

(37) ((1R)-1-(2-(3-(3-(2-(S,S-2,6-dimethylmorpholino)ethoxy)phenyl)-5-phenyl-1H-pyrazol-1-yl)acetamido)-3-methylbutyl)boronic acid hydrochloride;

(38) ((1R)-1-(2-(3-(3-(2-(S,R-2,6-dimethylmorpholino)ethoxy)phenyl)-5-phenyl-1H-pyrazol-1-yl)acetamido)-3-methylbutyl)boronic acid hydrochloride;

(39) (R)-(3-methyl-1-(2-(5-phenyl-3-(2-(4-phenylpiperazin-1-yl)ethoxy)phenyl)-1H-pyrazol-1-yl)acetamido)butyl)boronic acid hydrochloride;

(40) (R)-(3-methyl-1-(2-(5-phenyl-3-(3-(3-(4-phenylpiperazin-1-yl)propoxy)phenyl)-1H-pyrazol-1-yl)acetamido)butyl)boronic acid dihydrochloride;

(41) (R)-(3-methyl-1-(2-(5-phenyl-3-(3-(4-(4-phenylpiperazin-1-yl)butoxy)phenyl)-1H-pyrazol-1-yl)acetamido)butyl)boronic acid dihydrochloride;

(42) (R)-(3-methyl-1-(2-(5-phenyl-3-(3-((5-(4-phenylpiperazin-1-yl)pentyl)oxy)phenyl)-1H-pyrazol-1-acyl)acetamido)butyl)boronic acid dihydrochloride.

In one embodiment, the present application relates to a pharmaceutical composition, comprising the compound represented by formula I, the pharmaceutically acceptable salt or the stereoisomer thereof mentioned above, and a pharmaceutically acceptable excipient.

The pharmaceutical composition of the application can be prepared into any form of formulation, such as capsule, tablet, aerosol, solution, suspension, sugar-coating agent, lozenge, syrup, emulsion, ointment, cream, injection, powder, granule, paste, sustained release agent, foam agent. According to the route of administration, the drugs in this application can be prepared into oral administration preparation, nasal administration preparation, lung administration preparation, buccal preparation, subcutaneous administration preparation, intradermal administration preparation, transdermal administration preparation, parenteral administration preparation, rectal administration preparation, depot administration preparation, intravenous administration preparation, intraurethral administration preparation, intramuscular administration preparation, intranasal administration preparation, ophthalmic administration preparation, epidural administration preparation or local administration preparation.

The excipient described herein may be any pharmaceutically acceptable excipient, such as, but not limited to, solvent, propellant, solubilizer, cosolvent, emulsifier, colorant, disintegrant, filler, lubricant, wetting agent, osmotic pressure regulator, stabilizer, glidant, flavoring agent, preservative, suspending agent, antioxidant, penetration enhancer, pH regulator, surfactant, diluent, etc. For other available pharmaceutically acceptable pharmaceutical excipients, they can be found, for example, in "Handbook of Pharmaceutical Excipients" (Fourth Edition), edited by R. C. Rowe et al., translated by Zemin ZHENG, 2005, Chemical Industry Press.

In one embodiment, this application relates to the use of the compound represented by formula I, the pharmaceutically acceptable salt or the stereoisomer thereof mentioned above, or the pharmaceutical composition mentioned above in the preparation of a proteasome inhibitor. Preferably, the proteasome inhibitor can be prepared into a drug for treating or alleviating a proteasome-related disease (such as tumor, plasmodium infection, asthma, Alzheimer's disease, etc.). In an alternative embodiment, the present application relates to a method of treating or alleviating a proteasome-related disease, comprising administering to a subject in need thereof a therapeutically effective amount of the compound represented by formula I, the pharmaceutically acceptable salt or the stereoisomer thereof mentioned above, or the pharmaceutical composition mentioned above. In an alternative embodiment, the present application relates to a compound represented by formula I, a pharmaceutically acceptable salt or a stereoisomer thereof mentioned above, or a pharmaceutical composition mentioned above for use in treating or alleviating a proteasome-related disease.

Unless otherwise stated, the terms "patient", "subject" and "individual" herein are used interchangeably and refer to human or non-human animals (e.g., primates, rodents, etc.).

Unless otherwise stated, parameter values representing the quantity or physicochemical properties of components or reaction conditions herein should be understood to be modified by the term "about" in all cases. When the present invention is described by the term "about", the term "about" indicates the existing error value, for example, the variation within ±10%, for example, ±1% or ±0.1% of a specific value.

Unless otherwise stated, a singular term encompasses a plural term, and a plural term encompass a singular term herein. Similarly, unless otherwise expressly indicated in the context thereof, the word "or" is intended to cover "and".

Unless otherwise stated, the terms "comprise", "include" and "contain" or equivalents herein, which are open-ended mode expressions, mean that in addition to the listed element, component and step, other unspecified elements, components and steps may also be covered.

EXAMPLE

Next, the application will be described in details through examples, but the application is not limited to these examples. Unless otherwise stated, all reagents, materials and equipment used in the following examples are commercially available; and all reagents are commercially available chemically or analytically pure.

Route 1: Syntheses of Compound 1 to Compound 26

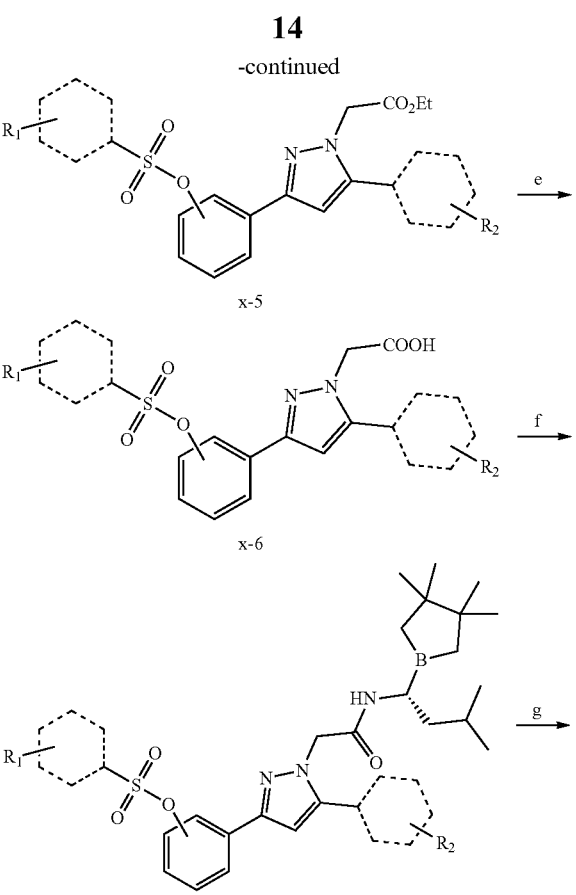

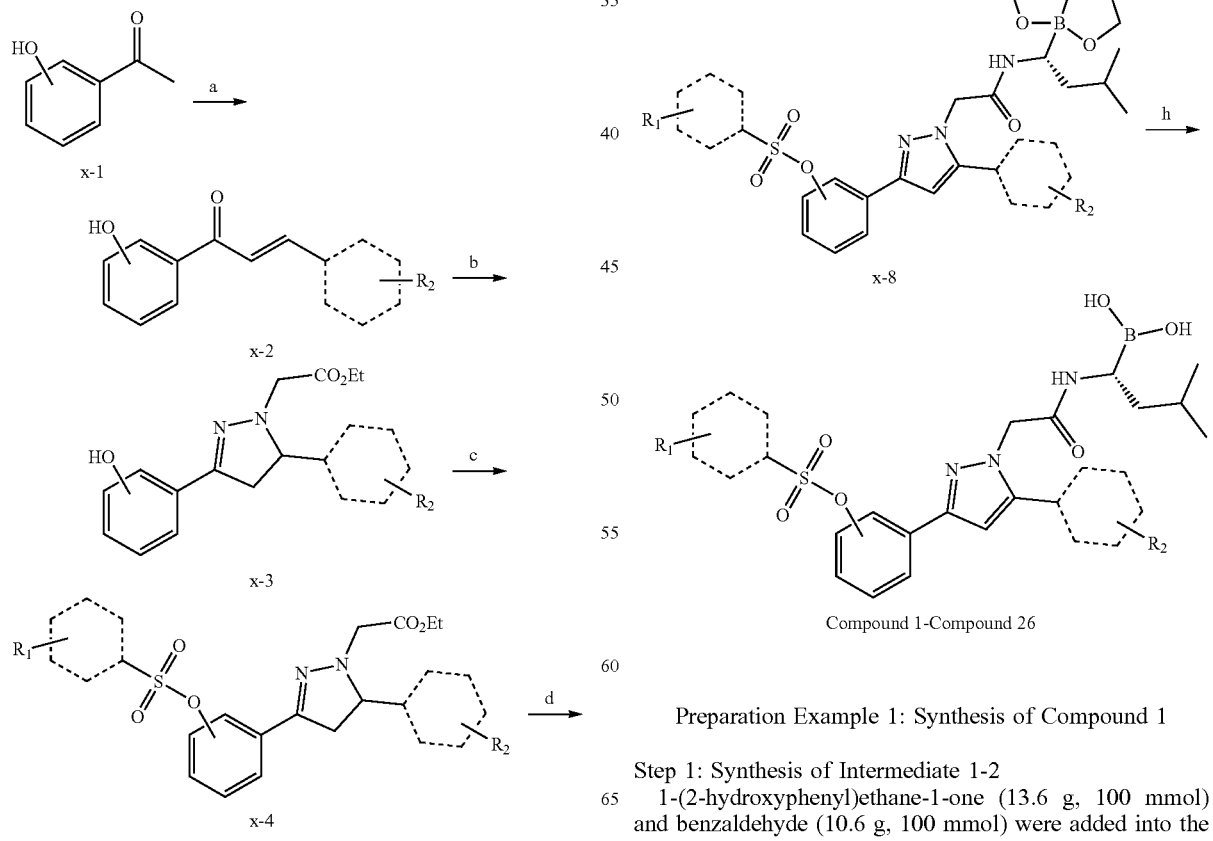

Compound 1-Compound 26

Preparation Example 1: Synthesis of Compound 1

Step 1: Synthesis of Intermediate 1-2

1-(2-hydroxyphenyl)ethane-1-one (13.6 g, 100 mmol) and benzaldehyde (10.6 g, 100 mmol) were added into the solution of KOH (16.8 g, 300 mmol) in 95% EtOH (125 mL). The solution was stirred at room temperature for 12 hours until the reaction was completed under the monitoring of TLC, which was poured into ice water (1000 mL), and acidified to pH 2-3 with 4N HCl. After standing, the precipitate was filtered and washed with water until the pH value reached 6-7, and dried in vacuum to give a yellow solid crude product (23.1 g, 95.1% yield).

Step 2: Synthesis of Intermediate 1-3

The crude product obtained in step 1 (8.69 g, 40 mmol) and ethyl hydrazinoacetate hydrochloride (7.74 g, 48 mmol) was suspended in EtOH (150 mL). The solution was heated to reflux for 12 h, and then concentrated under reduced pressure. The residue was dissolved in ethyl acetate (100 mL) and water (100 mL), and then acidified to pH 5-6 with citric acid. The organic layer was separated and washed with brine (50 mL×3), dried over anhydrous $Na_4SO_4$. After purification by column chromatography (silica gel, 3.3% ethyl acetate in petroleum ether), 7.2 g of yellow oil (55.6% yield) was obtained.

Step 3: Synthesis of Intermediate 1-4

60% NaH (0.16 g, 4 mmol) was added into the solution of the product of step 2 (0.648 g, 2 mmol) in tetrahydrofuran (15 mL) under ice bath and argon atmosphere. 3-(trifluoromethyl)benzene sulfonyl chloride (0.732 g, 3 mmol) was added thereto. The solution was stirred under ice bath for 30 minutes, followed by adding water (2 mL) and 4N HCl aqueous solution (2 mL) dropwise. The resulting mixture was concentrated under reduced pressure. The residue was dissolved in ethyl acetate (20 mL) and washed with water (20 mL). The water layer was extracted with ethyl acetate (10 mL×2), and the combined organic layer was washed with brine (50 mL), dried over anhydrous $Na_4SO_4$, and concentrated under reduced pressure. The crude product obtained was used for the next reaction without further purification.

Step 4: Synthesis of Intermediate 1-5

The crude product obtained in step 3 was dissolved in toluene (25 mL), and DDQ (0.454 g, 2 mmol) was add thereto. The resulting solution was stirred at 100° C. for 12 hours, and then cooled to room temperature. The solid was removed by filtration, and water (25 mL) and potassium carbonate (0.276 g, 2 mmol) were added to the filtrate, which were stirred for 30 min. The organic layer was separated, washed with brine (20 mL) and dried over anhydrous $Na_4SO_4$. After purification by column chromatography (silica gel, 10% ethyl acetate in petroleum ether), 0.78 g of yellow liquid (75.3% yield) was obtained.

Step 5: Synthesis of Intermediate 1-6

3N LiOH aqueous solution (2 mL) was added to the mixture of the product obtained in step 4 (0.78 g, 1.47 mmol) with tetrahydrofuran (15 mL) and water (15 mL). After stirring for 30 min, additional water (15 mL) was added, and tetrahydrofuran was removed under reduced pressure and low temperature. The residue was acidified to pH 2-3 with 4N HCl, and the precipitate was filtered and washed with water until pH 6-7. The title compound (0.69 g, 93.5%) was obtained and used for the next reaction without further purification.

Step 6: Synthesis of Intermediate 1-7

EDCl (0.23 g, 1.2 mmol) and HOBT (0.15 g, 1.1 mmol) were added to the stirred suspension of the product of step 5 (0.52 g, 1 mmol) in $CH_2Cl_2$ (30 mL). Pinacol leucine boronate hydrochloride (0.25 g, 1 mmol) and DIPEA (0.15 g, 1.2 mmol) were then added. The mixture was stirred for 12 h. The solvent was removed under reduced pressure, and the residue was dissolved in ethyl acetate (20 mL). The organic layer was washed with 0.1N HCl, brine, 5% $NaHCO_3$ and brine. The organic phase was dried over anhydrous $Na_4SO_4$. The solvent was evaporated to give the title compound (0.60 g, crude product with impurities), which was used for the next step without further purification.

Step 7: Synthesis of Compound 1

Diethanolamine (0.105 g, 1 mmol) was added to the solution of the product obtained in step 6 above (0.60 g, 0.86 mmol) in ether (15 mL), and the reaction mixture was stirred at room temperature for 12 h. The resulting precipitate was filtered, washed with ether, and then treated with a mixture of ethyl acetate (20 mL) and water (20 mL). 4N HCl was added into the suspension under stirring, and it was stirred for an additional 12 h. The organic layer was separated and washed with brine, saturated $NaHCO_3$ and brine, and dried over anhydrous $Na_2SO_4$. The organic solvent was removed under reduced pressure to provide compound 1 (0.33 g, 32.7% total yield) as a white solid. mp: 98-100° C. $^1$H NMR (400 MHz, DMSO) δ 8.75 (s, 1H), 7.97 (d, J=7.8 Hz, 1H), 7.84 (d, J=7.9 Hz, 1H), 7.78 (s, 1H), 7.67 (t, J=6.9 Hz, 3H), 7.57-7.47 (m, 2H), 7.36 (dq, J=21.4, 7.2 Hz, 5H), 6.46 (s, 1H), 4.58 (q, J=17.0 Hz, 2H), 2.57 (s, 1H), 1.44 (dt, J=12.9, 6.4 Hz, 1H), 1.14 (ddd, J=19.4, 14.3, 6.8 Hz, 2H), 0.70 (d, J=6.3 Hz, 6H); $^{13}$C NMR (101 MHz, DMSO) δ 169.6, 150.4, 146.4, 139.5, 136.2, 132.9, 132.5, 132.0, 132.0 (dd, J=3.5 Hz), 131.7, 131.6, 130.7 (dd, J=33.5 Hz), 128.9, 128.5, 128.2, 125.5, 124.3 (dd, J=7.3, 3.4 Hz), 123.9, 123.9, 123.2 (dd, J=273.1 Hz), 105.4, 50.5, 43.0, 40.7, 25.8, 23.3, 22.8. HRMS (ESI+ve) m/z calculated for $C_{30}H_{30}BF_3N_3O_5S$ (M+MeOH−$H_2O$+H)$^+$: 612.1961, found 612.19455.

Preparation Example 2 to Preparation Example 26 as shown in Route 1, compound 2 to compound 26 were obtained as white solid by using the same steps as the synthesis of compound 1. The compounds were shown in the following table:

| Compound No. | Compound characteristic data |
| --- | --- |
| 2 | 31.2% yield. mp: 101-103° C. $^1$H NMR (400 MHz, DMSO) δ 7.88 (q, J = 8.6 Hz, 4H), 7.73 (dd, J = 7.3, 2.1 Hz, 1H), 7.54-7.42 (m, 7H), 7.39 (dd, J = 7.7, 1.6 Hz, 1H), 6.38 (s, 1H), 4.75 (s, 2H), 3.20 (dd, J = 9.8, 5.2 Hz, 1H), 2.54 (dt, J = 3.5, 1.7 Hz, 2H), 1.57 (dd, J = 13.3, 7.0 Hz, 1H), 1.47-1.25 (m, 2H), 0.86 (dd, J = 9.6, 6.6 Hz, 6H); $^{13}$C NMR (101 MHz, DMSO) δ 166.8, 146.1, 145.5, 145.2, 138.7, 134.4 (q, J = 32.5 Hz, 130.2, 129.8, 129.6, 129.3, 129.2, 128.7, 128.5, 127.2, 126.9 (q, J = 3.6 Hz), 123.8, 123.5 (q, J = 273.5 Hz), 106.3, 52.6, 38.2, 38.1, 25.2, 23.7, 22.1. HRMS (ESI + ve) m/z calculated for $C_{30}H_{30}BF_3N_3O_5S$ (M + MeOH − $H_2O$ + H): 612.1961, found: 612.1946 |
| 3 | 18.9% yield. mp: 99-101° C. $^1$H NMR (400 MHz, DMSO) δ 7.85 (q, J = 8.6 Hz, 4H), 7.70 (dd, J = 7.3, 2.1 Hz, 1H), 7.40 (m, 8H), 6.36 (s, 1H), 4.72 (s, 2H), 3.17 (dd, J = 9.8, 5.2 Hz, 1H), 1.54 (dd, J = 13.3, 7.0 Hz, 1H), |

| Compound No. | Compound characteristic data |
|---|---|
| | 1.34 (m, 2H), 0.83 (dd, J = 9.6, 6.6 Hz, 6H); $^{13}$C NMR (101 MHz, DMSO) δ 166.8, 146.1, 145.5, 145.2, 138.7, 134.4 (q, J = 32.5 Hz), 130.2, 129.8, 129.6, 129.3, 129.2, 128.7, 128.5, 127.2, 126.9 (q, J = 3.6 Hz), 123.8, 123.5 (q, J = 273.5 Hz), 110.0, 106.3, 52.6, 38.2, 25.2, 23.7, 22.1. HRMS (ESI + ve) m/z calculated for $C_{30}H_{30}BF_3N_3O_5S$ (M + MeOH − $H_2O$ + H)$^+$: 612.1961, found: 612.1946 |
| 4 | 10.8% yield. mp: 91-93° C. $^1$H NMR (400 MHz, DMSO) δ 7.76 (m, 1H), 7.57 (dd, J = 9.2, 3.7 Hz, 2H), 7.51 (m, 7H), 7.43 (ddd, J = 7.0, 5.6, 2.0 Hz, 2H), 7.32 (m, 1H), 6.53 (s, 1H), 4.73 (s, 2H), 3.17 (m, 1H), 1.58 (dt, J = 13.2, 6.6 Hz, 1H), 1.36 (m, 2H), 0.86 (dd, J = 10.0, 6.6 Hz, 6H); $^{13}$C NMR (101 MHz, DMSO) δ 166.6, 164.9 (d, J = 364.4 Hz), 160.6, 146.3, 145.3, 145.2, 136.6 (d, J = 7.5 Hz), 132.3 (d, J = 8.0 Hz), 130.0, 129.9, 129.6, 129.3, 128.8, 128.3, 127.3, 125.0 (d, J = 2.9 Hz), 122.5 (d, J = 21.1 Hz), 123.5, 115.5 (d, J = 25.2 Hz), 106.5, 52.6, 38.1, 25.2, 23.8, 22.2. HRMS (ESI + ve) m/z calculated for $C_{29}H_{30}BFN_3O_5S$ (M + MeOH − $H_2O$ + H)$^+$: 562.1978, found: 562.1978 |
| 5 | 11.4% yield. m.p. 90-92° C. $^1$H NMR (400 MHz, DMSO) δ 7.76 (m, 2H), 7.64 (t, J = 1.8 Hz, 1H), 7.58 (dt, J = 7.9, 1.4 Hz, 1H), 7.51 (m, 6H), 7.44 (m, 2H), 7.38 (dd, J = 7.8, 1.6 Hz, 1H), 6.53 (s, 1H), 4.74 (s, 2H), 3.18 (dd, J = 9.8, 5.3 Hz, 1H), 1.58 (dt, J = 13.3, 6.5 Hz, 1H), 1.36 (m, 2H), 0.86 (dd, J = 10.3, 6.6 Hz, 6H); $^{13}$C NMR (101 MHz, DMSO) δ 166.7, 146.2, 145.4, 145.2, 136.4, 135.1, 134.3, 131.7, 130.0, 129.9, 129.7, 129.3, 129.3, 128.8, 128.4, 127.8, 127.3, 127.3, 123.6, 106.4, 52.7, 38.2, 25.2, 23.7, 22.2. HRMS (ESI + ve) m/z calculated for $C_{29}H_{30}BClN_3O_5S$ (M + MeOH − $H_2O$)$^+$: 578.1682, found: 578.1689 |
| 6 | 8.7% yield. m.p. 85-87° C. $^1$H NMR (400 MHz, DMSO) δ 8.35 (d, J = 8.2 Hz, 1H), 8.21 (m, 2H), 8.06 (d, J = 8.0 Hz, 1H), 7.96 (m, 8H), 7.86 (dd, J = 7.7, 1.2 Hz, 1H), 6.98 (s, 1H), 5.22 (s, 2H), 3.62 (dd, J = 9.8, 5.2 Hz, 1H), 2.02 (dt, J = 13.2, 6.6 Hz, 1H), 1.83 (m, 2H), 1.32 (dd, J = 12.3, 6.5 Hz, 6H); $^{13}$C NMR (101 MHz, DMSO) δ 166.8, 146.1, 145.5, 145.3, 138.0, 136.2, 131.8, 130.4, 129.9, 129.8, 129.7, 129.4, 129.3, 128.8, 128.5, 127.5, 127.1, 123.7, 122.4, 106.4, 52.6, 38.3, 25.2, 25.2, 23.6, 22.1. HRMS (ESI + ve) m/z calculated for $C_{29}H_{30}BBrN_3O_5S$ (M + MeOH − $H_2O$)$^+$: 622.1177, found: 622.1193 |
| 7 | 12.9% yield. m.p. 99-101° C. $^1$H NMR (400 MHz, DMSO) δ 7.90 (d, J = 7.4 Hz, 1H), 7.85 (d, J = 9.4 Hz, 2H), 7.77 (d, J = 8.3 Hz, 1H), 7.63 (d, J = 6.8 Hz, 1H), 7.45 (m, 7H), 7.12 (d, J = 7.9 Hz, 1H), 6.65 (s, 1H), 4.76 (S, 2H), 3.18 (dd, J = 8.6, 4.3 Hz, 1H), 1.57 (m, 1H), 1.36 (dtd, J = 20.8, 13.7, 6.3 Hz, 2H), 0.86 (dd, J = 10.7, 6.6 Hz, 6H); $^{13}$C NMR (101 MHz, DMSO) δ 166.7, 146.3, 145.3, 145.3, 136.4, 135.2, 134.6, 132.9, 131.2, 131.0, 130.0, 129.9, 129.8, 129.3, 129.3, 128.7, 128.5, 127.3, 123.0, 106.4, 52.8, 38.3, 25.2, 23.7, 22.2. HRMS (ESI + ve) m/z calculated for $C_{29}H_{29}BCl_2N_3O_5S$ (M + MeOH − $H_2O$ + H)$^+$: 558.2228, found: 558.2234 |
| 8 | 17.1% yield. m.p. 88-90° C. $^1$H NMR (400 MHz, DMSO) δ 7.82 (m, 1H), 7.50 (m, 8H), 7.42 (m, 3H), 7.28 (m, 1H), 6.55 (s, 1H), 4.74 (s, 2H), 3.16 (dd, J = 9.8, 5.2 Hz, 1H), 2.23 (s, 3H), 1.56 (dd, J = 13.6, 6.8 Hz, 1H), 1.36 (m, 2H), 0.83 (s, 6H); $^{13}$C NMR (101 MHz, DMSO) δ 166.7, 146.4, 145.5, 145.1, 139.9, 135.9, 135.0, 129.9, 129.8, 129.7, 129.6, 129.5, 129.3, 128.7, 128.3, 128.0, 127.1, 125.6, 123.2, 106.5, 52.6, 38.2, 25.2, 23.7, 22.1, 21.0. HRMS (ESI + ve) m/z calculated for $C_{30}H_3BN_3O_5S$ (M + MeOH − $H_2O$)$^+$: 612.1293, found: 612.1290 |
| 9 | 26.7% yield. m.p. 91-93° C. $^1$H NMR (400 MHz, DMSO) δ 8.08 (dd, J = 4.9, 1.1 Hz, 1H), 7.85 (m, 1H), 7.61 (dd, J = 3.8, 1.1 Hz, 1H), 7.55 (m, 5H), 7.44 (m, 2H), 7.32 (m, 1H), 7.15 (m, 1H), 6.67 (s, 1H), 4.78 (s, 2H), 3.17 (dt, J = 11.9, 3.7 Hz, 1H), 1.59 (dt, J = 13.0, 6.7 Hz, 1H), 1.37 (m, 2H), 0.87 (dd, J = 10.1, 6.6 Hz, 6H); $^{13}$C NMR (101 MHz, DMSO) δ 166.7, 146.5, 145.3, 137.6, 136.8, 133.5, 130.2, 129.6, 129.5, 129.3, 129.3, 128.9, 128.6, 128.2, 127.3, 123.0, 106.6, 52.7, 38.3, 25.2, 23.7, 22.3. HRMS (ESI + ve) m/z calculated for $C_{27}H_{29}BN_3O_5S_2$ (M + MeOH − $H_2O$)$^+$: 550.1636, found: 550.1633 |
| 10 | 6.2% yield. m.p. 101-103° C. $^1$H NMR (400 MHz, DMSO) δ 8.80 (d, J = 4.7 Hz, 1H), 8.70 (s, 1H), 8.02 (d, J = 8.1 Hz, 1H), 7.71 (d, J = 7.3 Hz, 1H), 7.45 (m, 9H), 6.50 (s, 1H), 4.71 (s, 2H), 3.16 (dd, J = 9.4, 5.2 Hz, 1H), 1.56 (td, J = 12.5, 6.0 Hz, 1H), 1.37 (m, 2H), 0.86 (dd, J = 9.3, 7.1 Hz, 6H); $^{13}$C NMR (101 MHz, DMSO) δ 166.6, 155.2, 148.4, 146.0, 145.3, 145.2, 136.6, 131.5, 130.1, 129.8, 129.3, 128.9, 128.5, 127.2, 124.7, 123.9, 106.4, 52.7, 38.2, 31.4, 25.2, 23.7, 22.2. HRMS (ESI + ve) m/z calculated for $C_{28}H_{30}BN_4O_5S$ (M + MeOH − $H_2O$)$^+$: 545.2024, found: 545.2038 |
| 11 | 30.8% yield. m.p. 78-80° C. $^1$H NMR (400 MHz, DMSO) δ 8.25 (t, J = 8.8 Hz, 2H), 8.13 (s, 1H), 7.97 (t, J = 7.9 Hz, 1H), 7.82 (d, J = 7.9 Hz, 1H), 7.53 (m, 7H), 6.98 (dd, J = 8.1, 2.3 Hz, 1H), 6.87 (s, 1H), 4.80 (s, 2H), 3.16 (m, 1H), 1.58 (m, 1H), 1.37 (m, 2H), 0.88 (m, 6H); $^{13}$C NMR (101 MHz, DMSO) δ 166.7, 149.6, 148.6, 146.3, 135.7, 135.5, 132.8, 132.3 (q, J = 3.2 Hz), 132.1, 131.0, 130.8 (q, J = 33.4 Hz), 129.9, 129.4, 129.3, 128.9, 125.1 (q, J = 3.4 Hz), 124.9, 123.4 (q, J = 273.1 Hz), 121.3, 118.8, 103.9, 52.7, |

| Compound No. | Compound characteristic data |
|---|---|
| | 38.2, 25.2, 23.6, 22.1. HRMS (ESI + ve) m/z calculated for $C_{30}H_{30}BF_3N_3O_5S$ (M + MeOH − $H_2O)^+$: 612.1946, found: 612.1948 |
| 12 | 28.44% yield. m.p. 94-96° C. $^1$H NMR (400 MHz, DMSO) δ 8.23 (d, J = 7.3 Hz, 2H), 8.09 (s, 1H), 7.97 (t, J = 7.9 Hz, 1H), 7.85 (d, J = 8.7 Hz, 2H), 7.53 (m, 5H), 7.13 (d, J = 8.8 Hz, 2H), 6.90 (s, 1H), 4.79 (s, 2H), 3.14 (dd, J = 9.8, 5.2 Hz, 1H), 1.55 (dt, J = 13.3, 6.5 Hz, 1H), 1.35 (m, 2H), 0.83 (dd, J = 11.0, 6.6 Hz, 6H); $^{13}$C NMR (101 MHz, DMSO) δ 166.9, 149.0, 148.6, 146.5, 135.7, 133.0, 132.9, 132.4 (q, J = 3.2 Hz), 132.2, 131.0 (q, J = 33.3 Hz), 130.1, 129.5, 129.4, 129.0, 127.3, 125.3 (q, J = 3.4 Hz), 123.5 (q, J = 273.1 Hz), 123.0, 104.1, 52.8, 38.4, 25.3, 23.7, 22.2. HRMS (ESI + ve) m/z calculated for $C_{30}H_{30}BF_3N_3O_5S$ (M + MeOH − $H_2O)^+$: 612.1946, found: 612.1948 |
| 13 | 8.5% yield. m.p. 98-100° C. $^1$H NMR (400 MHz, DMSO) δ 8.31 (d, J = 7.9 Hz, 1H), 8.17 (d, J = 8.1 Hz, 1H), 7.96 (m, 5H), 7.69 (m, 5H), 6.76 (s, 1H), 4.97 (s, 2H), 3.38 (dt, J = 9.8, 6.1 Hz, 1H), 1.77 (dt, J = 13.2, 6.6 Hz, 1H), 1.59 (m, 2H), 1.09 (dd, J = 17.5, 6.5 Hz, 6H); $^{13}$C NMR (101 MHz, DMSO) δ 166.6, 146.0, 145.3, 144.0, 135.6, 132.6, 131.9 (q, J = 2.6 Hz), 132.2, 131.5, 130.8, 130.2 (q, J = 33.2 Hz), 129.8, 129.8, 129.0, 128.5, 127.0, 124.7 (q, J = 3.2 Hz), 123.7, 123.3 (q, J = 273.2 Hz), 122.8, 106.6, 52.7, 38.4, 25.2, 23.7, 22.1. HRMS (ESI + ve) m/z calculated for $C_{30}H_{29}BBrF_3N_3O_5S$ (M+MeOH − $H_2O)^+$: 690.1051, found: 690.1056 |
| 14 | 17.5% yield. m.p. 86-88° C. $^1$H NMR (400 MHz, DMSO) δ 8.07 (d, J = 7.8 Hz, 1H), 7.93 (d, J = 7.6 Hz, 1H), 7.76 (m, 3H), 7.70 (m, 2H), 7.52 (d, J = 7.9 Hz, 1H), 7.45 (m, 4H), 6.57 (s, 1H), 4.73 (d, J = 9.8 Hz, 2H), 3.18 (m, 1H), 1.55 (dt, J = 13.2, 6.6 Hz, 1H), 1.36 (m, 2H), 0.86 (dd, J = 11.6, 6.5 Hz, 6H); $^{13}$C NMR (101 MHz, DMSO) δ 166.5, 146.1, 145.3, 143.6, 135.7, 132.7, 131.9 (d, J = 2.8 Hz), 132.1, 132.1, 131.6, 131.3, 131.2, 130.2 (d, J = 33.1 Hz), 129.9, 129.8, 128.5, 127.8, 127.0, 124.8 (d, J = 3.8 Hz), 123.6, 123.3 (d, J = 273.0 Hz), 122.4, 106.8, 52.8, 38.2, 25.2, 23.7, 22.2. HRMS (ESI + ve) m/z calculated for $C_{30}H_{29}BBrF_3N_3O_5S$ (M + MeOH − $H_2O)^+$: 690.1051, found 690.1056 |
| 15 | 6.9% yield. m.p. 100-102° C. $^1$H NMR (400 MHz, DMSO) δ 8.12 (d, J = 7.9 Hz, 1H), 8.05 (d, J = 8.1 Hz, 1H), 7.86 (s, 1H), 7.84 (s, 1H), 7.82 (s, 1H), 7.53 (m, 3H), 7.46 (ddd, J = 14.9, 6.9, 2.4 Hz, 3H), 7.40 (dd, J = 7.7, 1.7 Hz, 1H), 6.62 (s, 1H), 4.60 (s, 2H), 3.11 (dt, J = 9.5, 6.8 Hz, 1H), 1.46 (dd, J = 13.2, 6.6 Hz, 1H), 1.31 (m, 2H), 0.83 (m, 6H); $^{13}$C NMR (101 MHz, DMSO) δ 166.0, 146.0, 145.0, 143.3, 135.5, 133.4, 132.8, 132.6, 132.1, 131.8, 130.7, 130.3 () = 33.1 Hz), 129.7, 129.7, 128.4, 128.3, 126.9, 124.9 (J = 3.4 Hz), 123.5, 123.3 (J = 273.2 Hz), 123.0, 107.9, 52.5, 38.1, 25.1, 23.6, 22.2. HRMS (ESI + ve) m/z calculated for $C_{30}H_{29}BBrF_3N_3O_5S$ (M + MeOH − H2O)$^+$: 690.1051, found: 690.1055 |
| 16 | 21.8% yield. m.p. 92-94° C. $^1$H NMR (400 MHz, DMSO) δ 8.09 (d, J = 7.4 Hz, 1H), 7.95 (d, J = 7.5 Hz, 1H), 7.77 (dd, J = 15.1, 9.1 Hz, 3H), 7.57 (m, 2H), 7.45 (dd, J = 22.4, 7.8 Hz, 3H), 7.35 (t, J = 8.4 Hz, 2H), 6.52 (s, 1H), 4.72 (s, 2H), 3.16 (m, 1H), 1.55 (m, 1H), 1.37 (m, 2H), 0.87 (dd, J = 12.8, 6.3 Hz, 6H); $^{13}$C NMR (101 MHz, DMSO) δ 166.5, 165.3 (d, J = 259.5 Hz), 161.6, 146.1, 145.1, 144.2, 135.7, 132.7, 131.9 (q, J = 3.2 Hz), 131.6, 130.2 (q, J = 33.1 Hz), 129.8, 129.7, 128.4, 127.1, 126.4 (d, J = 3.1 Hz), 124.8 (q, J = 3.8 Hz), 123.6, 123.3 (d, J = 273.1 Hz), 116.2 (d, J = 21.7 Hz), 106.5, 52.6, 38.2, 25.2, 23.7, 22.2. HRMS (ESI + ve) m/z calculated for $C_{30}H_{29}BF_4N_3O_5S$ (M + MeOH − $H_2O)^+$: 630.1852, found: 630.1849 |
| 17 | 21.8% yield. m.p. 91-93° C. $^1$H NMR (400 MHz, DMSO) δ 8.07 (d, J = 7.7 Hz, 1H), 7.93 (d, J = 7.9 Hz, 1H), 7.78 (s, 1H), 7.73 (dd, J = 10.4, 4.6 Hz, 2H), 7.53 (m, 4H), 7.45 (ddd, J = 19.1, 9.6, 4.8 Hz, 3H), 6.52 (s, 1H), 4.72 (s, 2H), 3.13 (dd, J = 9.7, 5.1 Hz, 1H), 1.54 (m, 1H), 1.34 (m, 2H), 0.85 (dd, J = 16.3, 6.5 Hz, 6H); $^{13}$C NMR (101 MHz, DMSO) δ 166.5, 146.1, 145.2, 143.9, 135.6, 134.1, 132.7, 131.9 (q, J = 3.0 Hz), 131.6, 130.6, 130.2 (q, J = 33.1 Hz), 129.8, 129.8, 129.3, 128.7, 128.5, 127.0, 124.7 (q, J = 3.5 Hz), 123.7, 123.3 (q, J = 273.1 Hz), 106.6, 52.7, 38.2, 25.2, 23.7, 22.2, 22.1. HRMS (ESI + ve) m/z calculated for $C_{30}H_{29}BClF_3N_3O_5S$ (M + MeOH − $H_2O)^+$: 646.1556, found: 646.1554 |
| 18 | 14.1% yield. m.p. 111-113° C. $^1$H NMR (400 MHz, DMSO) δ 8.06 (d, J = 7.9 Hz, 1H), 7.95 (dd, J = 13.8, 8.3 Hz, 3H), 7.78 (s, 1H), 7.73 (m, 4H), 7.48 (dd, J = 7.6, 2.0 Hz, 1H), 7.43 (m, 2H), 6.63 (s, 1H), 4.79 (s, 2H), 3.13 (m, 1H), 1.51 (m, 1H), 1.34 (m, 2H), 0.84 (dd, J = 19.2, 6.5 Hz, 6H); $^{13}$C NMR (101 MHz, DMSO) δ 166.3, 146.1, 145.4, 143.5, 135.6, 134.4, 133.1, 132.7, 131.9 (d, J = 2.3 Hz), 131.6, 130.1 (q, J = 33.2 Hz), 129.9, 129.5, 128.5, 126.9, 124.8 (d, J = 3.7 Hz), 123.7, 123.3 (d, J = 273.0 Hz), 119.0, 111.7, 107.3, 53.0, 38.4, 25.2, 23.7, 22.1. HRMS (ESI + ve) m/z calculated for $C_{31}H_{29}BF_3N_4O_5S$ (M + MeOH − $H_2O)^+$: 637.1898, found: 637.1883 |
| 19 | 5.0% yield. m.p. 125-127° C. $^1$H NMR (400 MHz, DMSO) δ 8.06 (m, 3H), 7.95 (m, 1H), 7.76 (m, 5H), 7.46 (m, 3H), 6.64 (s, 1H), 4.79 (s, 2H), 3.30 (s, 3H), 3.14 (dd, J = 9.8, 5.3 Hz, 1H), 1.57 (dd, J = 13.5, 6.9 Hz, 1H), 1.37 (m, 2H), 0.86 (dd, J = 15.2, 6.5 Hz, 6H); $^{13}$C NMR (101 MHz, |

| Compound No. | Compound characteristic data |
|---|---|
| | DMSO) δ 166.4, 146.1, 145.4, 143.6, 141.1, 135.6, 134.8, 132.7, 131.9 (q, J = 3.1 Hz), 131.6, 130.2 (q, J = 33.1 Hz), 129.9, 129.9, 129.6, 128.5, 127.9, 126.9, 124.8 (q, J = 3.8 Hz), 123.7, 123.3 (q, J = 273.0 Hz), 107.3, 52.9, 43.9, 38.3, 25.2, 23.7, 22.2. HRMS (ESI + ve) m/z calculated for $C_{31}H_{32}BF_3N_3O_7S_2$ (M + MeOH − $H_2O$)$^+$: 690.1721, found: 690.1724 |
| 20 | 8.4% yield. m.p. 94-96° C. $^1$H NMR (400 MHz, DMSO) δ 8.04 (d, J = 7.9 Hz, 1H), 7.90 (d, J = 7.8 Hz, 1H), 7.73 (m, 3H), 7.43 (ddd, J = 16.6, 12.2, 7.6 Hz, 3H), 7.31 (m, 4H), 6.44 (d, J = 1.2 Hz, 1H), 4.66 (s, 2H), 3.13 (m, 1H), 2.36 (s, 3H), 1.51 (m, 1H), 1.33 (m, 2H), 0.83 (dd, J = 12.7, 6.4 Hz, 6H); $^{13}$C NMR (101 MHz, DMSO) δ 166.7, 146.0, 145.3, 139.0, 135.5, 132.6, 131.9 (q, J = 3.4 Hz), 131.8, 131.5, 130.2 (q, J = 33.2 Hz), 129.9, 129.7, 128.6, 128.5, 127.1, 126.8, 124.7 (q, J = 3.5 Hz), 123.6, 123.3 (q, J = 273.2 Hz), 106.1, 52.5, 38.2, 25.2, 23.6, 22.1, 21.2. HRMS (ESI + ve) m/z calculated for $C_{31}H_{32}BF_3N_3O_5S$ (M + MeOH − $H_2O$)$^+$: 626.2102, found: 626.2106 |
| 21 | 8.4% yield. m.p. 93-95° C. $^1$H NMR (400 MHz, DMSO) δ 8.08 (d, J = 7.9 Hz, 1H), 7.95 (d, J = 8.1 Hz, 1H), 7.76 (m, 3H), 7.43 (m, 5H), 7.07 (m, 2H), 6.46 (s, 1H), 4.69 (s, 2H), 3.84 (s, 3H), 3.18 (m, 1H), 1.58 (ddd, J = 13.4, 7.3, 5.2 Hz, 1H), 1.37 (dddd, J = 13.6, 10.7, 9.2, 5.3 Hz, 2H), 0.87 (dd, J = 10.5, 6.6 Hz, 6H); $^{13}$C NMR (101 MHz, DMSO) δ 166.7, 160.1, 146.1, 145.1, 145.0, 135.6, 132.7, 131.9 (q, J = 3.0 Hz), 131.6, 130.2, 130.2 (q, J = 33.1 Hz), 129.8, 129.6, 128.4, 127.3, 124.8 (q, J = 3.9 Hz), 123.6, 123.3 (q, J = 273.0 Hz), 122.2, 114.6, 105.9, 55.7, 52.6, 38.2, 25.2, 23.7, 22.2. HRMS (ESI + ve) m/z calculated for $C_{31}H_{32}BF_3N_3O_6S$ (M + MeOH − $H_2O$)$^+$: 642.2051, found: 642.2046 |
| 22 | 16.3% yield. m.p. 94-96° C. $^1$H NMR (400 MHz, DMSO) δ 8.07 (d, J = 7.7 Hz, 1H), 7.94 (d, J = 7.9 Hz, 1H), 7.79 (d, J = 7.2 Hz, 3H), 7.74 (dd, J = 7.5, 4.0 Hz, 4H), 7.58 (d, J = 8.1 Hz, 2H), 7.52 (t, J = 7.6 Hz, 2H), 7.44 (dt, J = 14.7, 4.5 Hz, 4H), 6.55 (s, 1H), 4.76 (s, 2H), 3.17 (m, 1H), 1.56 (dd, J = 12.9, 6.6 Hz, 1H), 1.35 (m, 2H), 0.83 (dd, J = 8.8, 6.8 Hz, 6H); $^{13}$C NMR (101 MHz, DMSO) δ 166.7, 146.1, 145.3, 144.8, 140.8, 139.7, 135.6, 132.7, 131.9 (q, J = 3.3 Hz), 131.6, 130.2 (q, J = 33.2 Hz), 129.8, 129.7, 129.6, 129.3, 128.5, 128.3, 127.4, 127.1, 127.1, 124.7 (q, J = 4.0 Hz), 123.6, 123.3 (q, J = 273.2 Hz), 106.4, 52.8, 52.7, 38.3, 25.2, 23.7, 22.1. HRMS (ESI + ve) m/z calculated for $C_{36}H_{34}BF_3N_3O_5S$ (M + MeOH − $H_2O$)$^+$: 688.2259, found: 688.2264 |
| 23 | 14.9% yield. m.p. 81-83° C. $^1$H NMR (400 MHz, DMSO) δ 8.06 (d, J = 7.9 Hz, 1H), 7.93 (d, J = 8.1 Hz, 1H), 7.75 (m, 3H), 7.65 (d, J = 7.0 Hz, 1H), 7.50 (d, J = 7.2 Hz, 2H), 7.43 (ddd, J = 6.7, 5.8, 2.7 Hz, 6H), 7.38 (m, 1H), 7.13 (d, J = 8.8 Hz, 2H), 6.45 (s, 1H), 5.18 (s, 2H), 4.68 (s, 2H), 3.17 (m, 1H), 1.57 (dt, J = 13.1, 6.6 Hz, 1H), 1.37 (m, 2H), 0.86 (dd, J = 11.4, 6.6 Hz, 6H); $^{13}$C NMR (101 MHz, DMSO) δ 166.8, 159.2, 146.1, 145.1, 145.0, 137.2, 135.6, 132.7, 131.9 (q, J = 3.5 Hz), 131.5, 130.2, 130.2 (q, J = 33.1 Hz), 129.8, 129.6, 129.0, 128.4, 128.2, 127.2, 124.7 (q, J = 3.9 Hz), 123.6, 123.3 (q, J = 273.0 Hz), 122.4, 115.5, 106.0, 69.8, 52.5, 38.3, 25.2, 23.7, 22.2. HRMS (ESI + ve) m/z calculated for $C_{37}H_{36}BF_3N_3O_6S$ (M + MeOH − $H_2O$)$^+$: 718.2365, found: 718.2357 |
| 24 | 16.3% yield. m.p. 83-84° C. $^1$H NMR (400 MHz, DMSO) δ 8.02 (d, J = 7.8 Hz, 1H), 7.87 (d, J = 7.9 Hz, 1H), 7.77 (s, 2H), 7.71 (dd, J = 8.1, 2.8 Hz, 2H), 7.43 (m, 3H), 6.73 (d, J = 3.0 Hz, 1H), 6.63 (s, 2H), 4.91 (s, 2H), 3.13 (dd, J = 9.4, 4.9 Hz, 1H), 1.59 (dt, J = 12.8, 6.5 Hz, 1H), 1.39 (m, 1H), 1.30 (dd, J = 14.6, 6.6 Hz, 1H), 0.83 (dd, J = 16.5, 6.7 Hz, 6H); $^{13}$C NMR (101 MHz, DMSO) δ 166.0, 146.1, 145.1, 143.9, 143.9, 135.7, 135.7, 132.6, 131.8, 131.9 (q, J = 3.2 Hz), 131.6, 130.2 (q, J = 33.1 Hz), 129.9, 129.8, 128.5, 126.9, 124.8 (q, J = 3.9 Hz), 123.7, 123.3 (q, J = 273.2 Hz), 112.2, 109.3, 104.9, 53.7, 38.2, 31.4, 25.2, 23.7. HRMS (ESI + ve) m/z calculated for $C_{28}H_{28}BF_3N_3O_6S$ (M + MeOH − $H_2O$)$^+$: 602.1738, found: 602.1745 |
| 25 | 18.7% yield. m.p. 88-90° C. $^1$H NMR (400 MHz, DMSO) δ 8.05 (d, J = 8.0 Hz, 1H), 7.91 (d, J = 8.1 Hz, 1H), 7.72 (m, 4H), 7.44 (m, 3H), 7.31 (dd, J = 3.6, 1.0 Hz, 1H), 7.18 (dd, J = 5.1, 3.6 Hz, 1H), 6.55 (s, 1H), 4.82 (s, 2H), 3.15 (dd, J = 9.8, 5.3 Hz, 1H), 1.59 (dt, J = 18.9, 6.5 Hz, 1H), 1.41 (ddd, J = 15.0, 9.8, 5.4 Hz, 1H), 1.32 (ddd, J = 13.7, 8.5, 5.3 Hz, 1H), 0.85 (dd, J = 12.6, 6.6 Hz, 6H); $^{13}$C NMR (101 MHz, DMSO) δ 166.3, 146.0, 145.2, 138.3, 135.5, 131.9 (q, J = 3.6 Hz), 132.6, 131.5, 130.2, 130.2 (q, J = 33.0 Hz), 129.8, 129.8, 128.5, 128.2, 127.8, 126.9, 124.7 (d, J = 4.1 Hz), 124.7, 123.7, 123.3 (d, J = 273.1 Hz), 106.7, 52.9, 38.2, 25.2, 23.7, 22.2, 22.2. HRMS (ESI + ve) m/z calculated for $C_{28}H_{28}BF_3N_3O_5S_2$ (M + MeOH − $H_2O$)$^+$: 618.1510, found: 618.1512 |
| 26 | 84.6% yield. m.p. 81.5-83.3° C. $^1$H NMR (400 MHz, DMSO) δ 8.23 (t, J = 8.8 Hz, 2H), 8.09 (s, 1H), 7.96 (t, J = 7.9 Hz, 1H), 7.70 (d, J = 7.9 Hz, 1H), 7.43 (dd, J = 15.4, 7.3 Hz, 2H), 6.94 (dd, J = 8.1, 2.0 Hz, 1H), 6.47 (s, 1H), 4.76 (s, 2H), 3.12 (dd, J = 9.6, 5.4 Hz, 1H), 2.25 (s, 3H), 1.61 (dt, J = 13.4, 6.6 Hz, 1H), 1.38 (m, 2H), 0.86 (dd, J = 11.7, 6.6 Hz, 6H); $^{13}$C NMR (101 MHz, DMSO) δ 166.55, 149.52, 147.87, 142.13, 135.88, 135.67, 132.67, 132.21 (q, J = 3.1 Hz), 132.19, 132.01, 130.94, 130.81 (q, J = 32.9 |

| Compound No. | Compound characteristic data |
|---|---|
| | Hz), 125.07 (q, J = 3.4 Hz), 124.63, 123.34 (q, J = 272.9 Hz), 120.97, 118.53, 51.98, 38.33, 25.26, 23.51, 22.17, 11.04. HRMS (ESI + ve) m/z calculated for $C_{23}H_{27}BN_3O_3$ (M + MeOH − $H_2O$)$^+$: 404.213999, found: 404.214765 |

Route 2: Synthesis of Compound 27

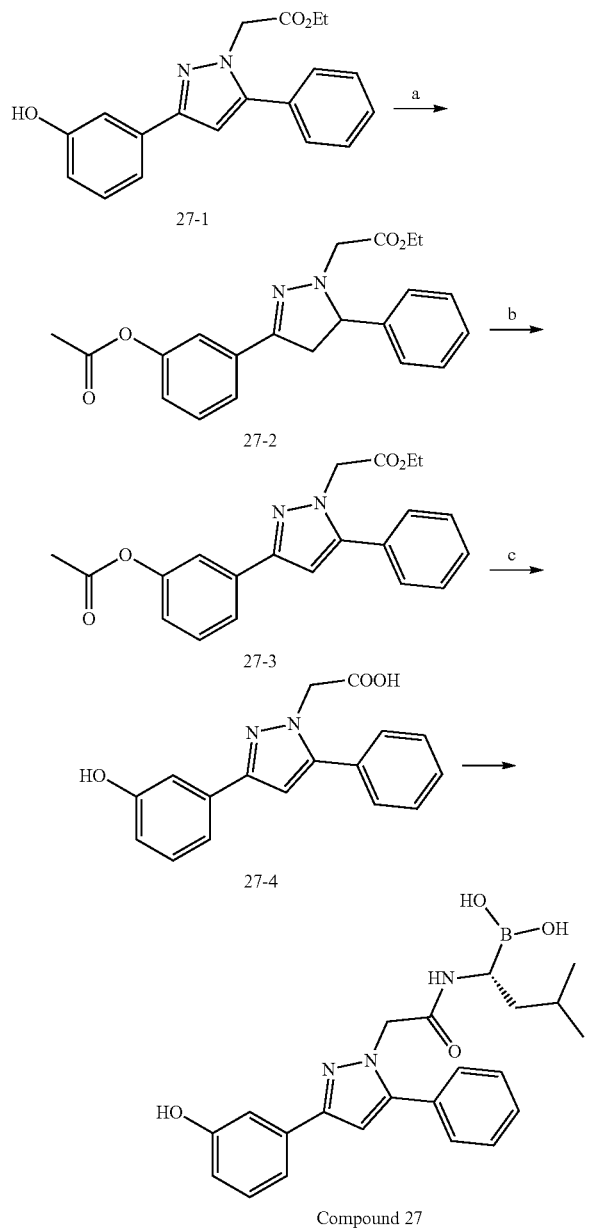

Preparation Example 27: Synthesis of Compound 27

Step 1: Synthesis of Intermediate 27-2

The tetrahydrofuran solution of 60% NaH (0.16 g, 4 mmol) was added to the solution of ethyl 2-(3-(3-hydroxyphenyl)-5-phenyl-4,5-dihydro-1H-pyrazol-1-yl)acetate in tetrahydrofuran (15 mL) under ice bath and argon atmosphere. Acetyl chloride (0.24 g, 3 mmol) was added thereto. The solution was stirred under ice bath for 30 minutes, followed by adding water (2 mL) and 4N HCl aqueous solution (2 mL) dropwise. The resulting mixture was concentrated under reduced pressure. The residue was dissolved in ethyl acetate (20 mL) and washed with water (20 mL). The water layer was extracted with ethyl acetate (10 mL×2), and the combined organic layer was washed with brine (50 mL), dried over anhydrous $Na_4SO_4$, and concentrated under reduced pressure to give the crude product of intermediate 27-2, which was directly used for the next reaction without further purification.

Step 2: Synthesis of Intermediate 27-3

DDQ (0.453 g, 2 mmol) was added to the solution of the crude product of intermediate 27-2 in PhMe (50 mL). The resulting solution was stirred at 100° C. for 12 hours, and then cooled to room temperature. The solid was removed through filtration, and water (25 mL) and potassium carbonate (0.276 g, 2 mmol) were added to the filtrate, which was stirred for 30 min. The organic layer was separated, washed with brine (20 mL), dried over anhydrous $Na_4SO_4$ and concentrated to give the crude product of intermediate 27-3 (75.3% yield), which was directly used for the next reaction without further purification.

Step 3: Synthesis of Intermediate 27-4

3N NaOH (2 mL) was added to the solution of the crude product of intermediate 27-3 in tetrahydrofuran (15 mL) and water (15 mL). The mixture was stirred at 50° C. for 12 hours, and then concentrated under reduced pressure to remove tetrahydrofuran. Additional water (15 mL) was added to the residue, and acidified to pH 2-3 with 4N HCl. The precipitate was filtered and washed with water until the pH value reached 6-7. The intermediate 27-4 (0.53 g, 89.4%) was obtained, which was directly used for the next reaction without further purification.

Step 4: Synthesis of Compound 27

According to the procedure shown in steps 6 and 7 of Preparation Example 1, compound 27 was obtained as white solid via being prepared from intermediate 27-4, with a yield of 66.0%. mp: 127-129° C. $^1$H NMR (400 MHz, DMSO) δ 7.56 (d, J=7.0 Hz, 2H), 7.47 (d, J=6.2 Hz, 3H), 7.22 (dd, J=16.0, 8.0 Hz, 3H), 6.80 (s, 1H), 6.73 (d, J=7.6 Hz, 1H), 4.76 (s, 2H), 3.14 (dd, J=9.3, 5.3 Hz, 1H), 1.55 (dd, J=12.9, 6.4 Hz, 1H), 1.32 (m, 2H), 0.84 (dd, J=10.7, 6.5 Hz, 6H); $^{13}$C NMR (101 MHz, DMSO) δ 166.8, 157.8, 150.2, 145.8, 134.8, 130.4, 130.1, 129.2, 129.2, 128.9, 116.7, 115.1, 112.3, 103.7, 52.7, 38.2, 25.2, 23.7, 22.3. HRMS (ESI+ve) m/z calculated for $C_{23}H_{27}BN_3O_3$ (M+MeOH−$H_2O$)$^+$: 404.2140, found 404.2146.

Route 3: Synthesis of Compound 28

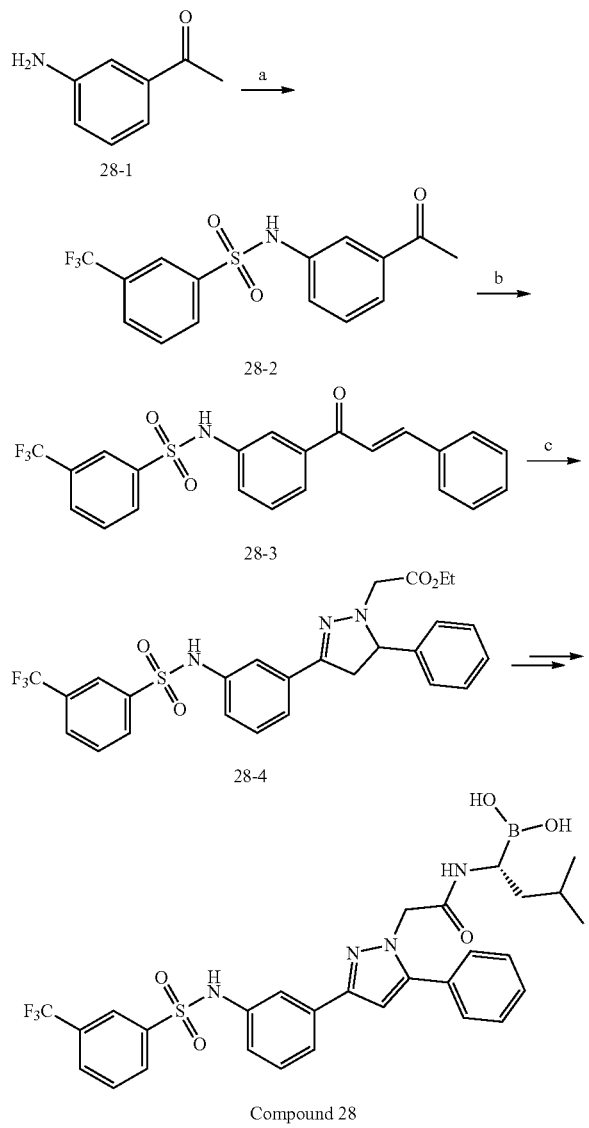

Preparation Example 28: Synthesis of Compound 28

Step 1: Synthesis of Intermediate 28-2

Et$_3$N (3.03 g, 30 mmol) and 3-(trifluoromethyl)benzene sulfonyl chloride (4.86 g, 20 mmol) were added to the solution of m-aminoacetophenone (2.70 g, 20 mmol) in CH$_2$Cl$_2$ (200 mL) dropwise under ice bath. The solution was stirred at room temperature for 12 hours, washed with brine, dried over anhydrous Na$_4$SO$_4$, and evaporated under reduced pressure to give the intermediate 28-2 (6.28 g, 91.6%) as a white solid.

Step 2: Synthesis of Intermediate 28-3

Using the same procedure as step 1 of Preparation Example 1, a yellow solid was obtained with a yield of 78.9%.

Step 3: Synthesis of Intermediate 28-4

The intermediate 28-3 (4.31 g, 10 mmol) and ethyl hydrazinoacetate hydrochloride (1.94 g, 12 mmol) were suspended in EtOH (100 mL). The solution was stirred under reflux for 12 hours, and then concentrated under reduced pressure. The residue was dissolved in ethyl acetate (100 mL) and water (100 mL), and then acidified to pH 5-6 with citric acid. The organic layer was separated and washed with brine (50 mL×3), and dried over anhydrous Na$_4$SO$_4$. After purification by column chromatography (silica gel, 8% ethyl acetate in petroleum ether), 2.39 g of intermediate 28-4 (45.0% yield, crude product with impurities) was obtained as a yellow liquid.

Step 4: Synthesis of Compound 28

Using the procedures shown in steps 3 to 7 of Preparation Example 1, compound 28 was obtained as white solid in 53.1% yield. mp: 119-120° C. $^1$H NMR (400 MHz, DMSO) δ 8.04 (m, 3H), 7.82 (t, J=7.8 Hz, 1H), 7.63 (s, 1H), 7.55 (m, 3H), 7.49 (dd, J=9.4, 4.7 Hz, 3H), 7.31 (t, J=7.9 Hz, 1H), 7.05 (dd, J=8.0, 1.3 Hz, 1H), 6.77 (s, 1H), 4.77 (s, 2H), 3.15 (dd, J=9.6, 5.4 Hz, 1H), 1.55 (dd, J=13.4, 6.6 Hz, 1H), 1.34 (m, 2H), 0.84 (dd, J=9.8, 6.6 Hz, 6H); $^{13}$C NMR (101 MHz, DMSO) δ 166.7, 149.3, 146.0, 140.9, 137.8, 134.6, 131.4, 131.2, 130.3 (d, J=32.6 Hz), 130.3, 130.2, 130.1 (d, J=3.1 Hz), 130.1, 129.2, 128.9, 123.7 (d, J=273.0 Hz), 123.7 (d, J=3.7 Hz), 122.3, 120.4, 117.8, 103.7, 52.8, 38.2, 25.2, 23.7, 22.3. HRMS (ESI+ve) m/z calculated for C$_{30}$H$_{31}$BF$_3$N$_4$O$_4$S (M+MeOH−H$_2$O)$^±$: 611.2106, found 611.2100.

Route 4: Synthesis of Compound 29 to Compound 42

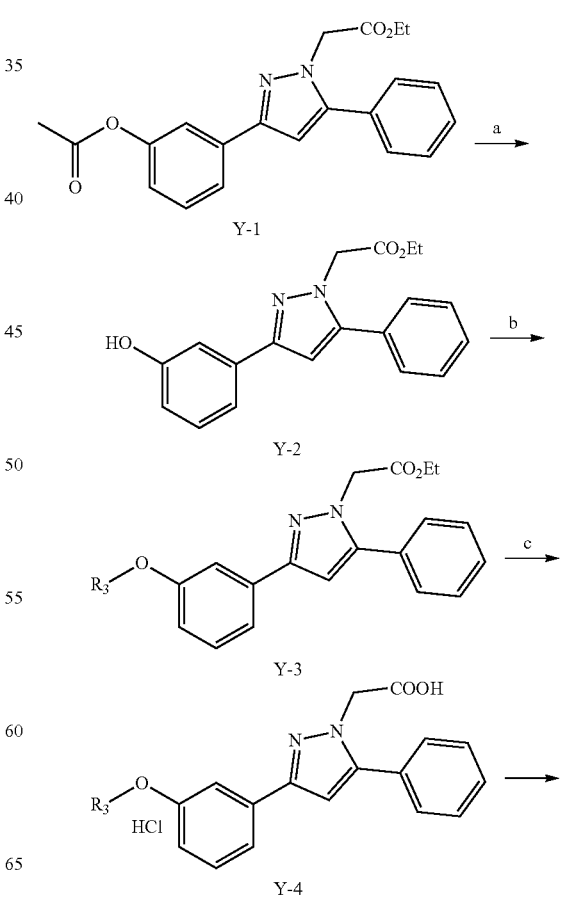

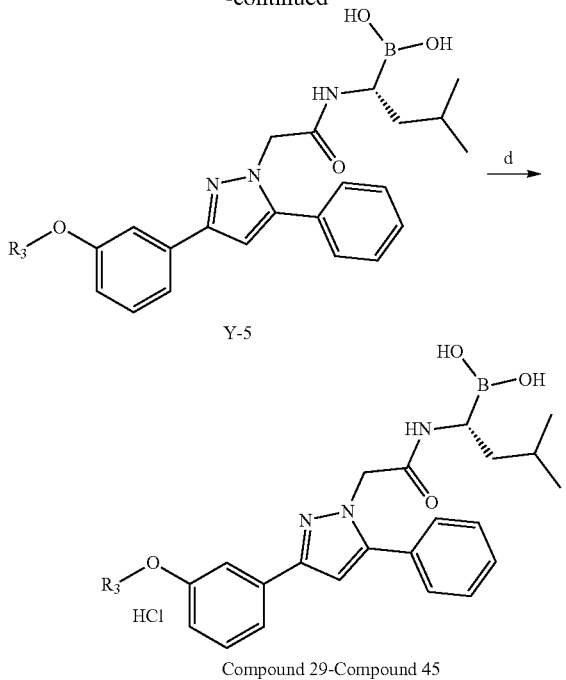

Compound 29-Compound 45

Preparation Example 29: Synthesis of Compound 29

Step 1: Synthesis of Intermediate Y-2 (29-2)

The concentrated hydrochloric acid (2 mL) was added to the solution of the crude product of ethyl 2-(3-(3-acetoxyphenyl)-5-phenyl-1H-pyrazol-1-yl)acetate (5 mmol) in EtOH (50 mL). The mixture was heated to reflux for 4 hours, and then cooled to room temperature. EtOH was removed under reduced pressure, and the residue was dissolved in ethyl acetate (30 mL), washed with brine, and dried over anhydrous $Na_4SO_4$. After purification by column chromatography (silica gel, 12% ethyl acetate in petroleum ether), 1.05 g of intermediate 29-2 (52.0% yield) was obtained as white solid.

Step 2: Synthesis of Intermediate Y-3 (29-3)

$K_2CO_3$ (0.28 g, 2 mmol) and 2-dimethylaminoethyl chloride hydrochloride (0.28 g, 2 mmol) were added to the solution of intermediate 29-2 (0.32 g, 1 mmol) in acetone (10 mL) and DMF (10 mL). The mixture was heated to reflux for 12 hours, cooled to room temperature, and then concentrated under the reduced pressure. The residue was dissolved in ethyl acetate (30 mL), washed with salt water, and dried over anhydrous $Na_4SO_4$. After purification by column chromatography (silica gel, 30% ethyl acetate in petroleum ether), 0.35 g of intermediate 29-3 was obtained as yellow oil (89.1% yield).

Step 3: Synthesis of Intermediate Y-4 (29-4)

The intermediate 29-3 (0.35 g, 0.89 mmol) was suspend in 4N HCl (15 mL), and then heated to reflux for 12 h. The resulting mixture was evaporated under reduced pressure to give the crude product of intermediate 29-4, which was used for the next reaction without further purification.

Step 4: Synthesis of Compound 29

The unsalted form 29-5 of compound 29 was obtained by using the procedures shown in steps 6 and 7 in Preparation Example 1 with a yield of 30.6%. The compound 29-5 (0.10 g, 0.21 mmol) was suspended in ethyl acetate (10 mL), and 2N ethyl acetate solution of hydrogen chloride (2 mL) was added thereto. The mixture was stirred at room temperature for 12 hours. The precipitate was filtered and washed with ethyl acetate. Finally, compound 29 (85.7 mg) was obtained as white solid. mp: 146-148° C. $^1$H NMR (400 MHz, DMSO) δ 7.57 (dd, J=7.6, 1.9 Hz, 2H), 7.51 (dd, J=10.7, 5.8 Hz, 6H), 7.39 (t, J=7.9 Hz, 1H), 6.99 (dd, J=8.2, 1.9 Hz, 1H), 6.93 (d, J=2.3 Hz, 1H), 4.80 (s, 2H), 4.40 (m, 2H), 3.55 (m, 2H), 3.14 (dd, J=9.6, 5.3 Hz, 1H), 2.89 (s, 6H), 1.55 (m, 1H), 1.34 (m, 2H), 0.85 (dd, J=11.0, 6.6 Hz, 6H); $^{13}$C NMR (101 MHz, DMSO) δ 166.8, 158.3, 149.8, 146.0, 134.9, 130.4, 130.2, 129.3, 128.9, 119.0, 114.6, 111.7, 103.9, 62.6, 55.9, 52.7, 43.2, 38.2, 25.2, 23.7, 22.2. HRMS (ESI+ve) m/z calculated for $C_{27}H_{36}BN_4O_3$ $(M+MeOH-H_2O)^+$: 475.2875, found 475.2870.

Preparation Example 30 to Preparation Example 42 as shown in Route 4, compound 30 to compound 42 were prepared by the same steps as the synthesis of compound 29. The compounds were each shown in the following table:

| Compound No. | Compound characteristic data |
| --- | --- |
| 30 | 32.7% yield. mp: 152-155° C. $^1$H NMR (400 MHz, DMSO) δ 7.58 (m, 2H), 7.49 (dd, J = 13.6, 7.7 Hz, 5H), 7.38 (t, J = 7.9 Hz, 1H), 6.96 (m, 2H), 4.79 (s, 2H), 4.41 (s, 2H), 3.84 (s, 4H), 3.43 (m, 2H), 3.17 (dd, J = 9.6, 5.2 Hz, 4H), 1.57 (td, J = 13.0, 6.4 Hz, 1H), 1.35 (m, 2H), 0.86 (dd, J = 10.5, 6.5 Hz, 6H); $^{13}$C NMR (101 MHz, DMSO) δ 166.7, 158.5, 149.8, 145.9, 135.0, 130.3, 129.2, 128.9, 118.7, 114.4, 111.6, 103.9, 64.3, 63.2, 55.9, 52.7, 52.6, 38.1, 25.2, 23.7, 22.3. HRMS (ESI + ve) m/z calculated for $C_{29}H_{38}BN_4O_4$ $(M + MeOH - H_2O)^+$: 517.2981, found: 517.2999 |
| 31 | 30.2% yield. mp: 138-140° C. $^1$H NMR (400 MHz, DMSO) δ 7.60 (d, J = 6.1 Hz, 2H), 7.50 (d, J = 6.7 Hz, 3H), 7.44 (m, 2H), 7.36 (t, J = 7.9 Hz, 1H), 6.93 (d, J = 9.9 Hz, 2H), 4.80 (s, 2H), 4.12 (t, J = 5.9 Hz, 2H), 3.56 (m, 4H), 3.19 (dd, J = 9.6, 5.2 Hz, 1H), 2.90 (m, 6H), 2.09 (s, 2H), 1.60 (dt, J = 13.3, 6.7 Hz, 1H), 1.37 (m, 2H), 0.87 (dd, J = 10.4, 6.5 Hz, 6H); $^{13}$C NMR (101 MHz, DMSO) δ 166.8, 159.2, 149.9, 145.9, 135.0, 130.4, 130.3, 129.2, 128.9, 118.2, 114.4, 111.3, 103.9, 65.7, 65.1, 54.6, 52.8, 52.6, 38.1, 25.2, 23.8, 22.3, 21.4. HRMS (ESI + ve) m/z calculated for $C_{30}H_{40}BN_4O_4$ $(M + MeOH - H_2O)^+$: 531.313713, found: 531.314913 |
| 32 | 63% yield. m.p. 148.2-152.4° C. $^1$H NMR (400 MHz, DMSO-d$_6$) δ 7.48-7.38 (m, 7H), 7.33-7.24 (m, 1H), 6.87 (d, J = 8.2, 2.5, 1.1 Hz, 1H), 6.63 (s, 1H), 4.90 (s, 2H), 4.12 (t, J = 6.3 Hz, 2H), 3.43 (d, J = 7.0 Hz, 1H), 3.19 (dd, J = 9.6, 5.2 Hz, 1H), 2.90 (t, J = 6.3 Hz, 2H), 2.65 (q, J = 7.1 Hz, 4H), 1.60 (dt, J = 13.3, 6.7 Hz, 1H), 1.37 (m, 2H), 1.08 (t, J = 7.1 Hz, 6H), 0.87 (dd, J = 10.4, |

| Compound No. | Compound characteristic data |
|---|---|
| | 6.5 Hz, 6H); $^{13}$C NMR (101 MHz, CDCl$_3$) δ 168.22, 159.19, 151.51, 146.01, 134.54, 130.30, 129.55, 128.91, 128.83, 128.79, 118.37, 114.45, 111.63, 104.08, 66.48, 55.93 51.75, 51.38, 47.82, 38.11, 30.90, 25.22, 23.72, 11.90. HRMS (ESI): m/z calcd. For C$_{29}$H$_{36}$BN$_4$O$_3$ [M + CH$_2$ + H − H$_2$O]$^+$: 503.3175, found 503.3171 |
| 33 | 80% yield. m.p. 154.3-158.4° C. $^1$H NMR (400 MHz, CDCl$_3$) δ 7.46 (d, J = 7.5 Hz, 7H), 7.33 (q, J = 7.8, 6.6 Hz, 1H), 6.91 (dd, J = 8.2, 2.5 Hz, 1H), 6.65 (s, 1H), 4.93 (s, 2H), 4.28-4.17 (m, 4H), 3.43 (d, J = 7.0 Hz, 1H), 2.69 (d, J = 6.1 Hz, 4H), 1.91-1.80 (m, 4H), 1.57 (td, J = 13.0, 6.4 Hz, 1H), 1.35 (m, 2H), 0.86 (dd, J = 10.5, 6.5 Hz, 6H); $^{13}$C NMR (101 MHz, CDCl$_3$) δ 168.22, 159.12, 151.50, 146.02, 134.55, 130.30, 129.57, 128.92, 128.83, 128.81, 118.47, 114.45, 111.79, 104.11, 66.96, 55.83, 55.08, 54.69, 51.39, 38.11, 25.22, 23.72, 23.49. HRMS (ESI): m/z calcd. For C$_{29}$H$_{34}$BN$_4$O$_3$ [M + CH$_2$ + H − H$_2$O]$^+$: 501.4283, found: 501.4279 |
| 34 | 89% yield. m.p. 152.4-154.7° C. $^1$H NMR (400 MHz, CDCl$_3$) δ 7.50-7.40 (m, 7H), 7.31 (t, J = 7.9 Hz, 1H), 6.89 (dd, J = 8.2, 2.6, 1.1 Hz, 1H), 6.65 (s, 1H), 4.92 (s, 2H), 4.25-4.15 (m, 4H), 3.43 (d, J = 7.0 Hz, 1H), 2.54 (t, J = 5.5 Hz, 4H), 1.63 (p, J = 5.6 Hz, 4H), 1.57 (td, J = 13.0, 6.4 Hz, 1H), 1.51-1.41 (m, 2H), 1.35 (m, 2H), 0.86 (dd, J = 10.5, 6.5 Hz, 6H); $^{13}$C NMR (101 MHz, CDCl$_3$) δ168.21, 159.17, 151.48, 146.00, 134.57, 130.31, 129.56, 128.91, 128.84, 128.79, 118.41, 114.41, 111.80, 104.07, 65.98, 58.03, 55.93, 55.06, 51.39, 38.11, 26.01, 25.22, 24.25, 23.72. HRMS (ESI): m/z calcd. For C$_{30}$H$_{40}$BN$_4$O$_3$ [M + CH$_2$ + H − H$_2$O]$^+$: 515.3281, found: 515.3288 |
| 35 | 90% yield. m.p. 189.3-194.7° C. $^1$H NMR (400 MHz, DMSO-d$_6$) δ 7.59-7.53 (m, 2H), 7.51-7.44 (m, 3H), 7.42-7.37 (m, 2H), 7.32 (t, J = 7.9 Hz, 1H), 6.93-6.86 (m, 2H), 4.76 (s, 2H), 4.11 (t, J = 5.7 Hz, 2H), 3.14 (dd, J = 9.8, 5.2 Hz, 1H), 2.71 (t, J = 5.7 Hz, 2H), 2.48 (s, 4H), 2.37 (s, 4H), 2.17 (s, 3H), 1.56 (ddt, J = 15.1, 12.9, 6.5 Hz, 1H), 1.41-1.30 (m, 1H), 1.25-0.98 (m, 1H), 0.84 (dd, J = 11.3, 6.6 Hz, 6H); $^{13}$C NMR (101 MHz, DMSO-d$_6$) δ 166.78, 159.22, 150.02, 145.91, 134.88, 130.35, 130.25, 129.85, 129.21, 129.18, 128.94, 119.36, 118.10, 115.59, 114.42, 111.40, 103.92, 66.00, 56.99, 56.41, 54.98, 53.24, 52.76, 45.95, 38.11, 25.23, 23.74. HRMS (ESI): m/z calcd. For C$_{30}$H$_{41}$BN$_5$O$_3$ [M + CH$_2$ + H − H$_2$O]$^+$: 530.3472, found: 530.3479 |
| 36 | 90% yield. m.p. 206.3-210.8° C. $^1$H NMR (400 MHz, DMSO-d$_6$) δ 7.59-7.53 (m, 2H), 7.51-7.44 (m, 3H), 7.42-7.37 (m, 2H), 7.32 (t, J = 7.9 Hz, 1H), 6.93-6.86 (m, 2H), 4.88 (s, J = 1.5 Hz, 2H), 4.23-4.10 (m, 4H), 2.85-2.74 (m, 4H), 1.90-1.82 (m, 2H), 1.57 (td, J = 13.0, 6.4 Hz, 1H), 1.35 (m, 2H), 1.14 (dd, J = 6.3, 1.6 Hz, 6H), 0.84 (dd, J = 11.3, 6.6 Hz, 6H); $^{13}$C NMR (101 MHz, CDCl$_3$) δ 206.85, 168.18, 159.05, 151.36, 146.02, 134.57, 130.20, 129.58, 128.93, 128.84, 128.74, 118.52, 114.44, 111.63, 104.03, 71.58, 65.59, 59.83, 57.28, 55.93, 51.34, 38.11, 25.22, 23.72, 19.17. HRMS (ESI): m/z calcd. For C$_{31}$H$_{44}$BN$_4$O$_4$ [M + CH$_2$ + H − H$_2$O]$^+$: 532.4137, found: 532.4148 |
| 37 | 32.8% yield. mp: 168-175° C. $^1$H NMR (400 MHz, DMSO-d$_6$) δ 7.58 7.54 (m, 2H), 7.52-7.44 (m, 3H), 7.43-7.36 (m, 2H), 7.32 (t, J = 7.9 Hz, 1H), 6.93-6.86 (m, 2H), 4.88 (s, J = 1.5 Hz, 2H), 4.23-4.10 (m, 4H), 2.85-2.74 (m, 4H), 1.90-1.82 (m, 2H), 1.58 (td, J = 13.0, 6.4 Hz, 1H), 1.34 (m, 2H), 1.12 (dd, J = 6.3, 1.6 Hz, 6H), 0.82 (dd, J = 11.3, 6.6 Hz, 6H); $^{13}$C NMR (101 MHz, CDCl$_3$) δ 206.75, 168.08, 159.15, 151.46, 146.32, 134.57, 130.60, 129.72, 128.93, 128.86, 128.77, 118.02, 115.44, 112.63, 105.23, 72.58, 65.67, 59.03, 57.48, 55.96, 51.44, 38.11, 25.83, 23.64, 19.16. HRMS (ESI): m/z calcd. For C$_{31}$H$_{44}$BN$_4$O$_4$ [M + CH$_2$ + H − H$_2$O]$^+$: 532.4137, found: 532.4796 |
| 38 | 34.6% yield. mp: 165-180° C. $^1$H NMR (400 MHz, DMSO-d$_6$) δ 7.56-7.50 (m, 2H), 7.51-7.43 (m, 3H), 7.46-7.38 (m, 2H), 7.38 (t, J = 7.9 Hz, 1H), 6.92-6.84 (m, 2H), 4.86 (s, J = 1.5 Hz, 2H), 4.23-4.12 (m, 4H), 2.84-2.74 (m, 4H), 1.92-1.84 (m, 2H), 1.58 (td, J = 13.0, 6.4 Hz, 1H), 1.32 (m, 2H), 1.10 (dd, J = 6.3, 1.6 Hz, 6H), 0.89 (dd, J = 11.3, 6.6 Hz, 6H); $^{13}$C NMR (101 MHz, CDCl$_3$) δ 206.95, 168.68, 159.65, 151.86, 146.82, 134.57, 131.20, 129.78, 128.98, 128.88, 128.78, 118.82, 114.94, 111.33, 104.63, 71.46, 65.60, 59.88, 57.38, 55.98, 51.64, 38.01, 25.97, 23.89, 20.06. HRMS (ESI): m/z calcd. For C$_{31}$H$_{44}$BN$_4$O$_4$ [M + CH$_2$ + H − H$_2$O]$^+$: 532.4137, found: 532.5637 |
| 39 | 90% yield. m.p. 186.8-188.9° C. $^1$H NMR (400 MHz, DMSO-d$_6$) δ 7.56 (dq, J = 6.2, 2.8, 2.3 Hz, 2H), 7.53-7.46 (m, 3H), 7.46-7.39 (m, 2H), 7.33 (t, J = 7.9 Hz, 1H), 7.25-7.14 (m, 2H), 6.95-6.88 (m, 4H), 6.81-6.73 (m, 1H), 4.76 (s, 2H), 4.17 (t, J = 5.7 Hz, 2H), 3.43 (d, J = 7.0 Hz, 1H), 3.17-3.12 (m, 4H), 2.79 (t, J = 5.7 Hz, 2H), 2.66 (t, J = 5.0 Hz, 4H), 1.56 (dt, J = 13.1, 6.4 Hz, 1H), 1.40-1.24 (m, 2H), 0.84 (dd, J = 11.4, 6.6 Hz, 6H); $^{13}$C NMR (101 MHz, CDCl$_3$) δ 168.25, 159.12, 151.46, 151.38, 146.08, 134.67, 130.30, 129.67, 129.14, 128.98, 128.89, 128.83, 119.69, 118.61, 116.09, 114.48, 111.82, 104.12, 66.04, 57.35, 55.84, 53.71, 51.43, 49.15, 38.23, 25.23, 23.69. HRMS (ESI): m/z calcd. For C$_{35}$H$_{43}$BN$_5$O$_4$ [M + CH$_2$ + H − H$_2$O]$^+$: 595.3331, found: 595.3452 |
| 40 | 89% yield. m.p. 201.4-208.9° C. $^1$H NMR (400 MHz, CDCl$_3$) δ 7.48-7.38 (m, 8H), 7.30 (q, J = 2.7 Hz, 2H), 6.96 (s, 2H), 6.89-6.83 (m, 2H), 6.73-6.66 (m, 1H), 4.84-4.77 (m, 2H), 4.08 (t, J = 6.2 Hz, 2H), 3.73 (q, J = 7.0 Hz, 1H), 2.67 (d, J = 20.6 Hz, 8H), 2.04 (q, J = 6.5 Hz, 2H), 1.52 (pd, J = 6.5, 3.3 Hz, 2H), 1.26 (t, J = 7.0 Hz, 3H), 0.83-0.78 (m, 6H); $^{13}$C NMR (101 |

| Compound No. | Compound characteristic data |
|---|---|
| | MHz, CDCl₃) δ 170.30, 159.38, 152.10, 151.18, 146.64, 133.99, 129.77, 129.31, 129.14, 129.10, 128.80, 119.83, 118.13, 116.12, 114.51, 111.64, 104.07, 73.22, 66.13, 58.41, 55.23, 53.24, 50.22, 39.43, 26.63, 26.14, 22.91. HRMS (ESI): m/z calcd. For $C_{36}H_{45}BN_5O_4$ $[M - H_2O + CH_2 + H]^+$: 609.3486, found: 609.3489 |
| 41 | 89% yield. m.p. 218.8-223.9° C. ¹H NMR (400 MHz, DMSO-d₆) δ 7.64 (s, 1H), 7.58 (d, J = 7.0 Hz, 1H), 7.48 (d, J = 7.2 Hz, 3H), 7.41 (d, J = 9.1 Hz, 3H), 7.32 (t, J = 8.2 Hz, 1H), 7.20 (s, 1H), 6.92-6.87 (m, 4H), 6.76 (q, J = 5.7, 3.9 Hz, 1H), 4.77 (s, 2H), 4.09-3.96 (m, 2H), 3.45 (p, J = 6.7 Hz, 1H), 3.15 (d, J = 22.4 Hz, 4H), 2.66 (t, J = 5.0 Hz, 4H), 2.41 (t, J = 8.1 Hz, 2H), 1.77 (q, J = 7.8 Hz, 2H), 1.62 (d, J = 16.4 Hz, 2H), 1.34 (dt, J = 14.1, 3.5 Hz, 1H), 1.24 (s, 1H), 1.05 (d, J = 7.1 Hz, 1H), 0.87-0.71 (m, 6H); ¹³C NMR (101 MHz, CDCl₃) δ 168.26, 159.37, 151.55, 151.39, 146.04, 134.58, 130.31, 129.61, 129.31, 129.11, 128.95, 128.87, 128.82, 119.63, 118.35, 117.13, 116.03, 114.42, 111.60, 104.13, 67.71, 58.31, 55.93, 53.28, 51.41, 49.15, 38.11, 27.99, 27.39, 25.22, 23.72. HRMS (ESI): m/z calcd. For $C_{36}H_{45}BN_5O_4$ $[M - H_2O + CH_2 + H]^+$: 623.3587, found: 623.3591 |
| 42 | 89% yield. m.p. 239.6-243.88° C. ¹H NMR (400 MHz, DMSO-d₆) δ 7.56 (dq, J = 4.5, 2.5 Hz, 2H), 7.48 (pd, J = 5.7, 4.5, 1.6 Hz, 3H), 7.39 (d, J = 8.5, 5.2, 1.5 Hz, 2H), 7.32 (t, J = 7.9 Hz, 1H), 7.22-7.15 (m, 2H), 6.92-6.87 (m, 3H), 6.76 (t, J = 7.2 Hz, 1H), 4.76 (s, 2H), 4.02 (t, J = 6.4 Hz, 2H), 3.53-3.48 (m, 4H) 3.47-3.40 (m, 1H), 3.13 (dt, J = 19.2, 5.2 Hz, 4H), 2.34 (t, J = 7.2 Hz, 2H), 1.76 (p, J = 6.6 Hz, 2H), 1.61-1.52 (m, 2H), 1.46 (q, J = 7.7, 6.5 Hz, 2H), 1.39-1.33 (m, 1H), 1.31-1.23 (m, 1H), 1.06 (t, J = 7.0 Hz, 1H), 0.84 (dd, J = 11.6, 6.6 Hz, 6H); ¹³C NMR (101 MHz, CDCl₃) δ 168.23, 159.40, 151.56, 151.39, 146.01, 134.57, 130.33, 129.57, 129.30, 129.09, 128.92, 128.84, 128.81, 119.60, 118.30, 117.14, 116.02, 114.39, 111.62, 104.11, 67.80, 58.65, 55.73, 53.35, 51.41, 38.11, 33.71, 29.28, 26.70, 25.22, 24.16, 23.72. HRMS (ESI): m/z calcd. For $C_{36}H_{45}BN_5O_4$ $[M - H_2O + CH_2 + H]^+$: 637.4673, found: 637.4674 |

Pharmacological Experiment

1) Cell Activity Test

The effect of compounds on tumor cell proliferation was detected by CellTiter-Glo method. Human melanoma cell line A375, non-small cell lung cancer cell line A549, human lung adenocarcinoma cell line H1299, colorectal cancer cell line HCT116, liver cancer cell line HepG2 and gastric cancer cell line MGC80-3 were cultured in vitro. The cells were collected after growing to the logarithmic growth phase, centrifuged at 1000 rpm for 5 min, and suspended in an appropriate amount of medium after discarding the supernatant, and the cell concentration was adjusted to $2 \times 10^4$/mL. The cell suspension was inoculated onto the 384-well cell culture plate, with 50 μL per well. After being cultured in a cell incubator (37° C., 5% $CO_2$) for 24 h, 5 μL of drug diluted by the cell culture medium was added into each well for the treatment group. Each drug was provided in triplicate. After 72 h incubation in the incubator, 20 μL of CellTiter-Glo was added into each well, and the relative luminescence unit (RLU) was measured with Multimode Microplate Reader Varioskan Flash (Thermo Scientific, USA) after placed at 37° C. for 20 min, and compared with the RLU of the control group. SigmaPlot 10.0 software was used to calculate the inhibition rate and $IC_{50}$ value. The results were shown in the following table:

TABLE 1

Inhibition rate of compounds on the growth of three tumor cells

| | A549 (%) | | A375 (%) | | HCT116 (%) | |
|---|---|---|---|---|---|---|
| compound | 10 μM | 1 μM | 10 μM | 1 μM | 10 μM | 1 μM |
| 1 | 66.4 | 11.9 | 98.4 | 5.8 | 98.0 | 13.1 |
| 2 | 61.7 | 15.1 | 97.8 | 8.6 | 97.9 | 1.4 |
| 3 | 60.6 | 17.1 | 98.2 | 5.7 | 97.8 | 3.0 |
| 4 | 69.3 | 15.0 | 98.2 | 5.6 | 97.6 | 6.2 |
| 5 | 67.2 | 10.2 | 97.9 | 2.2 | 97.3 | 9.0 |
| 6 | 64.7 | 13.3 | 95.0 | 7.0 | 97.0 | 5.9 |
| 7 | 52.0 | 16.5 | 96.0 | 3.7 | 96.6 | 3.5 |
| 8 | 73.4 | 2.9 | 98.9 | 1.8 | 98.5 | 2.1 |
| 9 | 83.2 | 3.6 | 98.3 | 4.6 | 98.3 | 2.9 |
| 10 | 72.9 | 0.1 | 98.0 | 1.5 | 98.0 | 6.6 |
| 11 | 90.3 | 63.4 | 98.8 | 90.2 | 98.4 | 95.4 |
| 12 | 85.3 | 45.5 | 98.7 | 83.0 | 96.3 | 45.8 |
| 13 | 10.4 | 4.5 | 41.3 | 8.1 | 3.3 | 8.2 |
| 14 | 8.0 | 10.8 | 50.4 | 16.5 | 9.2 | 9.9 |
| 15 | 1.5 | 7.5 | 67.2 | 3.0 | 3.6 | 5.0 |
| 16 | 36.9 | 1.6 | 91.9 | 14.2 | 93.8 | 8.3 |
| 17 | 1.9 | 0.3 | 56.1 | 8.3 | 70.6 | 13.6 |
| 18 | 29.0 | 7.1 | 81.1 | 4.6 | 89.7 | 5.5 |
| 19 | 7.9 | 8.7 | 45.2 | 4.1 | 33.9 | 14.5 |
| 20 | 4.2 | 1.2 | 61.9 | 11.5 | 85.1 | 9.2 |
| 21 | 6.4 | 4.4 | 44.1 | 2.0 | 62.2 | 11.4 |
| 22 | 16.1 | 3.7 | 39.1 | 10.9 | 18.1 | 3.9 |
| 23 | 63.4 | 7.4 | 77.0 | 5.7 | 55.6 | 2.6 |
| 24 | 66.7 | 1.9 | 97.0 | 14.9 | 97.1 | 4.9 |
| 25 | 71.2 | 6.2 | 97.7 | 10.3 | 97.2 | 5.3 |

TABLE 2

Inhibitory effect of compounds on some tumor cells

| Compound No. | Cell line ( IC$_{50}$ value, µM ) | | | | |
|---|---|---|---|---|---|
| | H1299 | A375 | HCT116 | A549 | HepG2 |
| 1 | 7.19 | 8.91 | 6.53 | — | — |
| 11 | — | 2.60 | 0.70 | 1.06 | — |
| 26 | — | 2.59 | 1.41 | 3.07 | — |
| 27 | — | 0.91 | 0.30 | 0.68 | — |
| 28 | — | 8.25 | 3.41 | 8.68 | — |
| 29 | — | 1.43 | 0.92 | 3.64 | — |
| 30 | — | 0.822 | 0.63 | 3.05 | — |
| 31 | — | 0.69 | 0.50 | 2.19 | — |
| 32 | — | — | 0.427 | — | — |
| 33 | — | — | 0.925 | — | — |
| 34 | — | — | 0.891 | — | — |
| 35 | — | — | 0.281 | — | — |
| 36 | — | — | 0.057 | — | — |
| 37 | — | — | — | — | 0.060 |
| 38 | — | — | — | — | 0.126 |
| 39 | — | — | 0.084 | — | 0.054 |
| 40 | — | — | — | — | 0.101 |
| 41 | — | — | — | — | 0.123 |
| 42 | — | — | — | — | 0.121 |

2) Enzyme Activity Test

Proteasome-Glo™ Cell-Based assay kit (Promega, USA) was used to determine the activity of the target compound against the 20S proteasome. Human chronic myeloid leukemia cell line (K562, 6000 cells/well) was inoculated into the 384 well plate in 20 µL/well. The cells were then equilibrated at 37° C., 5% CO$_2$ for 2 hours. Each 384 well plate was set with the mock group and treatment group, and each well of the treatment group was added with 5 µL of the compound solution with the final concentration of 40 µM, 13.3 µM, 4.44 µM, 1.48 µM, 0.49 µM, 0.16 µM, 0.055 µM, 0.0183 µM, 0.0030 µM, 0.0061 µM. The cells was incubated with the drugs for 2 hours at 37° C., 5% CO$_2$ before adding 25 µL of corresponding Proteasome-Glo™ Cell-Based reagent per well. The relative luminescence unit (RLU) was measured by using Multimode Microplate Reader Varioskan Flash (Thermo Scientific, USA) after 15 min and compared with the RLU of the control group. SigmaPlot 10.0 software was used to calculate IC$_{50}$ value. The results were shown in the following table:

TABLE 3

Inhibitory activity of compounds 30 and 39 on proteasome subunits

| | IC50 (µM) | |
|---|---|---|
| Compound | β1 | β5 |
| 30 | 2.04 | 0.40 |
| 39 | — | 0.2 |

Pharmacokinetic Test

This experiment includes the PO group and IV group, with three animals in each group. For the PO group, about 0.25 mL of whole blood was collected from orbital venous plexus before administration, and 15 min, 30 min, 1 h, 2 h, 4 h, 7 h and 24 h after administration, and for the IV group, about 0.25 mL of whole blood was collected from orbital venous plexus before administration, and 5 min, 15 min, 30 min, 1 h, 2 h, 4 h, 7 h and 24 h after administration, which were placed in heparin anticoagulant tube. After the blood collection, the blood collection tubes containing anticoagulant agent was inverted several times to fully mix, and placed on wet ice before centrifugation. Within 60 minutes after blood collection, it was centrifuged at 8000 rpm under 2 to 8° C. for 10 minutes to separate red blood cells and obtain plasma samples. The plasma sample was transferred to a cryogenic tube and stored at −75±15° C. until analysis. 50 µL of the plasma sample was taken and added with 5 µL of acetonitrile:water (1:1, v/v), and added with 200 µL of 0.1% formic acid-acetonitrile, centrifuged (12000 rpm, 15 min); the supernatant was diluted in 1:1 with ultrapure water. The plasma drug concentration was analyzed by using LC-MS/MS method. Microsoft EXCEL was used to statistically describe the experimental data with mean, deviation % and standard deviation (SD). The pharmacokinetic parameters were calculated with WinNonlin 8.1 software. The following pharmacokinetic parameters were calculated: CL (clearance), V$_d$ (apparent volume of distribution), T$_{1/2}$ (elimination half-life time), C$_{max}$ (peak concentration), T$_{max}$ (peak time), AUC (area under the blood concentration-time curve), and F % (bioavailability).

TABLE 4

Average pharmacokinetic parameters in plasma of male SD rats after a single intravenous injection of 1 mg/kg of compound 39 and oral administration of 10 mg/kg of compound 39

| Parameter | IV Mean ± SD | PO Mean ± SD |
|---|---|---|
| T$_{1/2}$ (h) | 7.63 ± 0.30 | 1.63 ± 0.36 |
| T$_{max}$ (h) | 0.083 | 0.33 ± 0.14 |
| C$_{max}$ (ng/ml) | 671 ± 124 | 74.8 ± 82.0 |
| AUC$_{0-t}$ (h · ng/ml) | 767 ± 117 | 186 ± 147 |
| AUC$_{0-\infty}$ (h · ng/ml) | 807 ± 123 | 191 ± 147 |
| C0 (ng/ml) | 846 ± 183 | NA |
| CL_obs (mL/min/kg) | 21.0 ± 3.4 | NA |
| V$_d$ (L/kg) | 13.9 ± 2.8 | NA |
| F (%) | NA | 2.42 ± 1.91 |

NA: Not applicable.

It can be seen from Table 4 that after a single tail vein injection of compound 39 in SD rats, the area under the blood concentration-time curve (AUC$_{0-t}$) was 767±117 h·ng/mL and the apparent volume of distribution (V$_d$) was 13.9±2.8 L/kg, which was higher than the total liquid volume of SD rats, indicating that the drug was widely distributed in vivo; the clearance (CL) was 21.0±3.4 mL/min/kg, belonging to compounds with medium clearance; the elimination half-life (T$_{1/2}$) in vivo was 7.63±0.30 h. After the intragastric administration of 10 mg/kg of compound 39 to SD rats, the area under the blood concentration-time curve (AUC$_{0-t}$) was 186±147 h·ng/mL, the peak concentration (C$_{max}$) was 74.8±82.0 ng/mL, the peak time (T$_{max}$) was 0.33±0.14 h, the elimination half-life (T$_{1/2}$) in vivo was 1.63±0.36 h, and the bioavailability was 2.42±1.91%. Pharmacokinetic studies showed that compound 39 was widely distributed in male SD rats, with moderate clearance and rapid absorption.

Antitumor Spectrum Study

The activity of compound 30 was evaluated by MTT method against seven tumor cell models, A549, A375, HCT116, MDA-MB-231, HepG2, PC3 and MCF-7. All cells used in the study were prepared at a concentration of $3.5 \times 10^3$ cells/mL, and each 100 mL cell suspension was inoculated on a 96-well microtiter plate for 24 hours (37° C., 5% $CO_2$). Then different concentrations of compound 30 were added, incubated for 72 hours; and for the control group, equivalent concentrations of DMSO (final concentration 0.5%) were added. The number of viable cells was measured by MTT (3-(4,5-dimethylthiazol-2-yl)-diphenyl tetrazolium bromide) method, and the OD value at 492/620 nm was recorded. The $IC_{50}$ value was calculated by Prism-Graphpad software based on the results of triplicate experiments.

Results were shown in Table 5, compound 30 had significant inhibitory activity on the growth of seven kinds of tumor cells, among which the $IC_{50}$ against HCT116 and MCF-7 reached 0.63 μM and 0.69 μM, respectively.

TABLE 5

Activities of compound 30 on seven tumor cells

| | $IC_{50}$ (μM) | | | | | | |
|---|---|---|---|---|---|---|---|
| Compound | A549 | A375 | HCT116 | MDA-MB-231 | HepG2 | PC3 | MCF-7 |
| 30 | 3.05 | 0.82 | 0.63 | 0.94 | 1.08 | 0.82 | 0.69 | week with a digital electronic caliper. The tumor volume calculation formula was $TV = ab^2/2$; and the relative tumor volume calculation formula was $RTV = V_t/V_o$, wherein $V_o$ was the tumor volume measured on the first day of administration (d1), and $V_t$ was the tumor volume at each measurement. On the $22^{nd}$ day of administration (d22), the animals were sacrificed and weighed. The tumor mass was dissected and weighed. The tumor inhibition rate (tumor inhibitory rate, %) was calculated according to the following formula:

$$\text{Inhibition rate \%} = \frac{\text{average } RTV \text{ of the mock group} - \text{average } RTV \text{ of the administration group}}{\text{average } RTV \text{ of the mock group}} \times 100\%$$

The results of anti-tumor activity in vivo were shown in Table 6. The tumor inhibition rate of compound 30 on human liver cancer Bel7404 was 61.29%, 36.55% and 24.89% at the dose of 50 mg/kg, 25 mg/kg and 12.5 mg/kg, respectively.

TABLE 6

Antitumor effect of compound 30 intravenous injection on human liver cancer Bel7404 transplanted in nude mice ($\bar{x} \pm SD$)

| Group | Dose (mg/kg) | Dosing regimen | Animal number begin | Animal number end | Animal weight (g) (After tumor removal) | RTV (d22) | Inhibition rate % |
|---|---|---|---|---|---|---|---|
| Mock | | | 8 | 8 | 24.21 ± 1.27 | 6.02 ± 0.98 | |
| 5FU | 15 | ip × 7 | 5 | 5 | 23.14 ± 0.58 | 2.78 ± 0.37** | 53.77 |
| 30 L | 12.5 | iv × 5 | 5 | 5 | 23.11 ± 0.65 | 4.52 ± 1.08* | 24.89 |
| 30 M | 25 | iv × 5 | 5 | 5 | 21.91 ± 0.56** | 3.82 ± 0.67** | 36.55 |
| 30 H | 50 | iv × 5 | 5 | 5 | 19.95 ± 0.45** | 2.33 ± 0.59** | 61.29 |

Compared with the mock group:
*P < 0.05,
**P < 0.01.

Study on Antitumor Activity In Vivo

In the test, the Bel7404 models of human liver cancer transplanted into 6-week-old male BALB/c athymic nude mice (purchased from Shanghai Slac Laboratory Animal Co., Ltd.) with body weight of 18-20 g were used to study the anti-tumor effect of compound 30. The dose of compound 30 was 50 mg/kg (30H group), 25 mg/kg (30 M group) and 12.5 mg/kg (30 L group), respectively, and was injected intravenously twice a week for 5 times in total; at the same time, 5-FU was used as the control drug, which was injected intraperitoneally twice a week for 7 times in total (5 mice/group for the compound 30 administration group, 5 mice in 5 FU administration group; 8 mice were used as the mock group). The long diameter a (mm) and the vertical short diameter b (mm) of the tumor were measured twice a Study on the Maximum Tolerated Dose in Mice Healthy non-tumor bearing female NOD/SCID mice (purchased from Sipeifu Biotechnology Co., Ltd.) were selected for the Maximum Tolerated Dose (MTD) test. Compound 39 was administered to NOD/SCID mice directly through a single tail vein injection, and the vehicle (0.3 mL DMSO, 0.27 mL Tween-80, 2.43 mL normal saline) was used as the control group. According to the dose of compound 39, the administration group was divided into three groups: low-dose group (10 mg/kg), medium-dose group (20 mg/kg), and high-dose group (30 mg/kg), with seven mice in each group. The body weight and the survival and health status of mice after administration (the day before administration was recorded as "Day 0") were observed to determine the maximum tolerated dose of mice. The weight of mice was measured once a day, and the data were shown in Table 7.

TABLE 7

Average body weight change of mice

| Group | body weight (M ± S.E.) | | | | | | | |
|---|---|---|---|---|---|---|---|---|
| | Day 0 | Day 1 | Day 2 | Day 3 | Day 4 | Day 5 | Day 6 | Day 7 |
| Control | 24.9 ± 0.3 | 25.8 ± 0.3 | 26.1 ± 0.4 | 26.0 ± 0.4 | 25.7 ± 0.4 | 26.1 ± 0.2 | 25.8 ± 0.6 | 25.9 ± 0.6 |
| Low-dose | 24.2 ± 0.8 | 24.5 ± 0.8 | 23.3 ± 1.1 | 23.4 ± 1.0 | 23.7 ± 1.1 | 24.1 ± 1.0 | 24.4 ± 0.8 | 24.7 ± 0.7 |
| Medium-dose | 24.7 ± 0.2 | 24.1 ± 0.5 | 22.8 ± 0.4 | 22.7 ± 0.4 | 22.8 ± 0.5 | 23.3 ± 0.6 | 23.7 ± 0.7 | 24.0 ± 0.7 |
| High-dose | 24.2 ± 0.5 | 24.0 ± 0.5 | 22.4 ± 0.6 | 22.5 ± 0.6 | 22.7 ± 0.7 | 22.9 ± 0.6 | 22.5 ± 0.6 | 23.1 ± 0.4 |

The results showed that compound 39 was safe to be administered at doses of 30 mg/kg or less, and the average body weight change of mice was not more than 5%.

Pharmacodynamic Study on Human Multiple Myeloma RPMI 8226 In Vivo

The anti-tumor effect in vivo was studied by using the tumor animal model obtained by subcutaneous xenotransplantation of cell lines into female NOD/SCID mice (purchased from Sipeifu Biotechnology Co., Ltd.).

RPMI 8226 cells were subcutaneously inoculated into NOD/SCID mice, and human multiple myeloma subcutaneously transplanted tumor model was successfully established 9 days after inoculating the cells. The test was divided into vehicle (0.3 mL DMSO, 0.27 mL Tween-80, 2.43 mL normal saline) control group, compound 30 low-dose group (20 mg/kg), compound 30 medium-dose group (30 mg/kg), compound 30 high-dose group (40 mg/kg), compound 39 low-dose group (5 mg/kg), compound 39 medium-dose group (10 mg/kg), and compound 39 high-dose group (15 mg/kg), and bortezomib (API purchased from Yangtze River Pharmaceutical) was used as the positive control group (0.5 mg/kg); 5 tumor-bearing mice established above in each group were administered by tail vein twice a week for nine times in total. The long diameter a (mm) of the tumor and the short diameter b (mm) of the tumor perpendicular to the long diameter were measured with digital electronic caliper twice a week. The calculation formula of tumor volume was: $TV = ab^2/2$; and the calculation formula of relative tumor volume was: $RTV = V_t/V_o$, $V_o$ was the tumor volume measured when the mice in each group were divided into cages and administered for the first time (d1), and $V_t$ was the tumor volume measured at the last administration. The animals were sacrificed 31 days (d22) after inoculation of RPMI 8226 cells, and weighed. The tumor mass was dissected and weighed, and the tumor inhibition rate was calculated according to the following formula:

$$\text{Inhibition rate \%} = \frac{\text{average } RTV \text{ of the control group} - \text{average } RTV \text{ of the administration group}}{\text{average } RTV \text{ of the control group}} \times 100\%$$

The results of antitumor activity of compound 30 in vivo were shown in Table 8. The tumor inhibition rates of compound 30 against human multiple myeloma RPMI 8226 at doses of 20 mg/kg, 30 mg/kg and 40 mg/kg were 72.45%, 82.53% and 92.07%, respectively.

TABLE 8

In vivo antitumor results of compound 30 in RPMI 8226 human multiple myeloma model

| | The day of the last administration | | | | |
|---|---|---|---|---|---|
| Test group | Tumor volume ($\bar{x} \pm S$) | Relative tumor volume ($\bar{x} \pm S$) | TGI (%) | T/C (%) | P value (relative to vehicle control group) |
| Vehicle control group | 779.02 ± 119.72 | 9.33 ± 1.87 | — | — | — |
| Low-dose group (20 mg/kg, BIW) | 267.27 ± 77.46 | 2.57 ± 0.61 | 72.45 | 27.55 | p < 0.05 |
| Medium-dose group (30 mg/kg, BIW) | 147.56 ± 33.02 | 1.63 ± 0.32 | 82.53 | 17.47 | p < 0.001 |
| High-dose group (40 mg/kg, BIW) | 72.06 ± 13.62 | 0.74 ± 0.12 | 92.07 | 7.93 | p < 0.001 |
| Positive control group | 359.97 ± 65.13 | 5.17 ± 0.98 | 44.59 | 55.41 | p > 0.05 |

1. Data were expressed as "mean ± standard error";
2. T/C % = $T_{RTV}/C_{RTV} \times 100\%$ or T/C % = $T_{TV}/C_{TV} \times 100\%$; TGI % = (1 – T/C %) × 100% ($T_{RTV}$: average RTV of the treatment group; $C_{RTV}$: average RTV of the control group; $T_{TV}$: average TV of the treatment group; $C_{TV}$: average TV of the control group).

The results of antitumor activity of compound 39 in vivo were shown in Table 9. The tumor inhibition rates of compound 39 against human multiple myeloma RPMI 8226 at doses of 5 mg/kg, 10 mg/kg and 15 mg/kg were 83.82%, 93.35% and 96.14%, respectively.

TABLE 9

In vivo antitumor results of compound 39 in RPMI 8226 human multiple myeloma model

| | The day of the last administration | | | | |
|---|---|---|---|---|---|
| Test group | Tumor volume ($\bar{x} \pm S$) | Relative tumor volume ($\bar{x} \pm S$) | TGI (%) | T/C (%) | P value (relative to vehicle control group) |
| Vehicle control group | 779.02 ± 119.72 | 9.33 ± 1.87 | — | — | — |

TABLE 9-continued

In vivo antitumor results of compound 39 in RPMI 8226 human multiple myeloma model

| | The day of the last administration | | | | |
|---|---|---|---|---|---|
| Test group | Tumor volume ($\bar{x} \pm S$) | Relative tumor volume ($\bar{x} \pm S$) | TGI (%) | T/C (%) | P value (relative to vehicle control group) |
| Low-dose group (5 mg/kg, BIW) | 177.55 ± 51.28 | 1.51 ± 0.38 | 83.82 | 16.18 | p < 0.001 |
| Medium-dose group (10 mg/kg, BIW) | 75.06 ± 19.64 | 0.62 ± 0.28 | 93.35 | 6.65 | p < 0.001 |
| High-dose group (15 mg/kg, BIW) | 21.79 ± 3.50 | 0.36 ± 0.02 | 96.14 | 3.86 | p < 0.001 |
| Positive control group | 359.97 ± 65.13 | 5.17 ± 0.98 | 44.59 | 55.41 | p > 0.05 |

1. Data were expressed as "mean ± standard error";
2. T/C % = $T_{RTV}/C_{RTV}$ × 100% or T/C % = $T_{TV}/C_{TV}$ × 100%; TGI % = (1 − T/C %) × 100% ($T_{RTV}$: average RTV of the treatment group; $C_{RTV}$: average RTV of the control group; $T_{TV}$: average TV of the treatment group; $C_{TV}$: average TV of the control group).

It can be seen that the compounds prepared in the Examples of the present invention can show excellent antitumor activities.

For the purpose of describing and disclosing, all patents, patent applications and other publications are expressly incorporated herein by reference. These publications are provided solely for their disclosure prior to the filing date of this application. All statements regarding the dates of these documents or the representation of the contents of these documents are based on the information available to the applicants and do not constitute any admission as to the correctness of the dates of these documents or the contents of these documents. Moreover, any reference to these publications herein does not constitute an admission that the publications form part of the common general knowledge in the art in any country.

Those skilled in the art will recognize that the scope of this application is not limited to the various specific embodiments and examples described above, but various modifications, replacements, or recombination can be made without departing from the spirit of this application, which fall within the scope of protection of this application.

What is claimed is:

1. A compound represented by formula I, a pharmaceutically acceptable salt or a stereoisomer thereof:

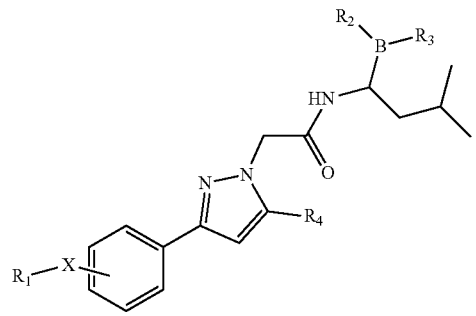

wherein $R_1$ is H, phenyl, $C_{1-4}$ alkyl, or a 5-membered or 6-membered heterocyclyl containing 1-3 heteroatoms selected from the group consisting of N or O or S, or

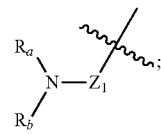

the phenyl is optionally substituted by halogen, $C_{1-4}$ haloalkyl and/or $C_{1-4}$ alkyl; and the $Z_1$ is a $C_{1-10}$ hydrocarbon group or a heterohydrocarbon group obtained by substituting one or more carbon atoms in $C_{1-10}$ hydrocarbon group with a heteroatom selected from the group consisting of O, S or N; and the $R_a$ and $R_b$ are each independently H or $C_{1-4}$ alkyl, or $R_a$ and $R_b$ form a 5-membered to 10-membered saturated heterocyclyl with the N atom to which they connect, the 5-membered to 10-membered saturated heterocyclyl contains 0-3 heteroatoms selected from the group consisting of N, O or S in addition to the N atom, and the 5-membered to 10-membered saturated heterocyclyl is optionally substituted by $C_{1-4}$ alkyl, phenyl, or a 5-membered or 6-membered heterocyclyl containing 1-3 heteroatoms;

$R_2$ and $R_3$ are each independently OH, $C_{1-4}$ alkyl or $O(O)C_{1-4}$ alkyl, or $R_2$ and $R_3$ form a 4 to 15-membered ring

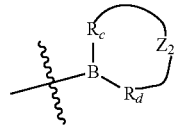

with the B atom to which they connect;
the $R_c$ and $R_d$ are each independently O, S, NH, $NR_e$, —CO, —NHCO, —$NR_f$CO, —OS(O)$_2$, —NHS(O)$_2$ or —$NR_g$—SO$_2$; and the $Z_2$ is a $C_{1-10}$ hydrocarbon group, or a heterohydrocarbon group obtained by substituting one or more carbon atoms in $C_{1-10}$ hydrocarbon group with a heteroatom selected from the group consisting of O, S or N, or one or more $R_c$ and/or $R_d$;
the $R_e$, $R_f$ and $R_g$ are each independently halogen, $C_{1-10}$ alkyl, $C_{1-10}$ alkoxy, or $C_{1-10}$ haloalkyl;
$R_4$ is $C_{1-4}$ alkyl, phenyl, or a 5-membered or 6-membered heterocyclyl containing 1-3 heteroatoms selected from the group consisting of N or O or S, and the phenyl is optionally substituted by halogen, cyano, $C_{1-4}$ alkyl, $C_{1-4}$ alkoxy, phenyl, $C_{1-4}$ alkylsulfonyl and/or phenyl $C_{1-4}$ alkoxy;
X is NH, O, S, —OS(O)$_2$—, or —NHS(O)$_2$—.

2. The compound, the pharmaceutically acceptable salt or the stereoisomer thereof according to claim 1, wherein $R_1$ is H, phenyl, halogenated phenyl, $C_{1-4}$ haloalkyl phenyl, $C_{1-4}$ alkyl phenyl, a 5-membered or 6-membered unsaturated heterocyclyl containing 1-3 heteroatoms selected from the group consisting of N or O or S, or

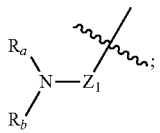

the $Z_1$ is $C_{1-10}$ alkyl; the $R_a$ and $R_b$ are each independently $C_{1-4}$ alkyl, or the $R_a$ and $R_b$ form a 5-membered to 7-membered saturated heterocyclyl with the N atom to which they connect, and the 5-membered to 7-membered saturated heterocyclyl is optionally substituted by $C_{1-4}$ alkyl or phenyl.

3. The compound, the pharmaceutically acceptable salt or the stereoisomer thereof according to claim 1, wherein $R_1$ is H, phenyl, halogenated phenyl, $C_{1-4}$ haloalkyl phenyl, and $C_{1-4}$ alkyl phenyl,

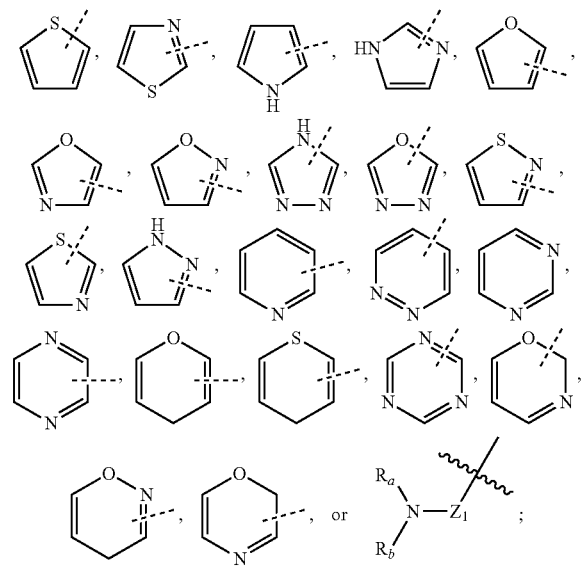

the $Z_1$ is $C_{1-6}$ alkyl;
the $R_a$ and $R_b$ are each independently $C_{1-4}$ alkyl group, or the $R_a$ and $R_b$ form a 5-membered or 6-membered saturated heterocyclyl with the N atom to which they connect, and the 5-membered or 6-membered saturated heterocyclyl is optionally substituted by $C_{1-4}$ alkyl or phenyl.

4. The compound, the pharmaceutically acceptable salt or the stereoisomer thereof according to claim 1, wherein $R_1$ is H, $C_{1-4}$ haloalkyl phenyl, fluorophenyl, chlorophenyl, bromophenyl, $C_{1-4}$ alkyl phenyl,

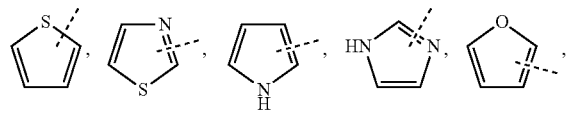

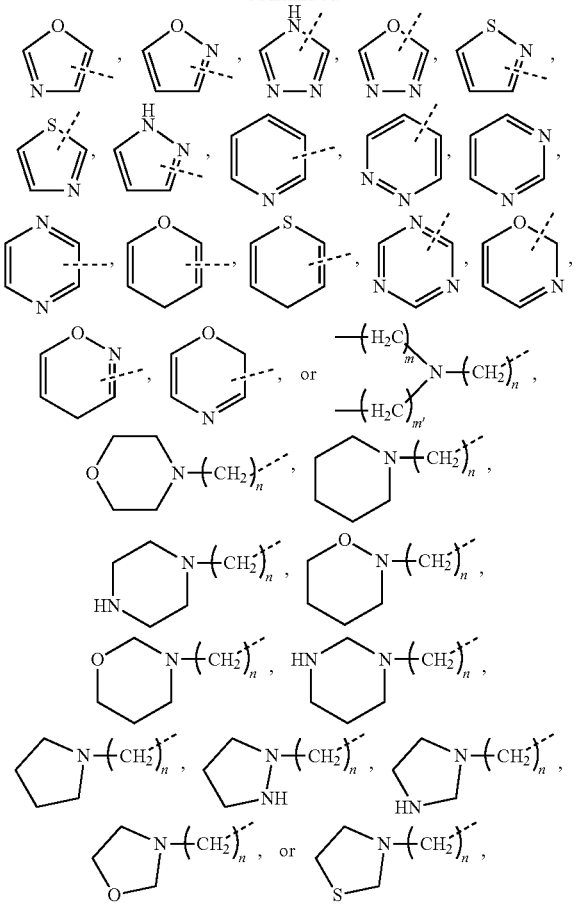

n is an integer selected from the group consisting of 1-6, m and m' are the same or different and are each independently an integer selected from the group consisting of 0-3; and

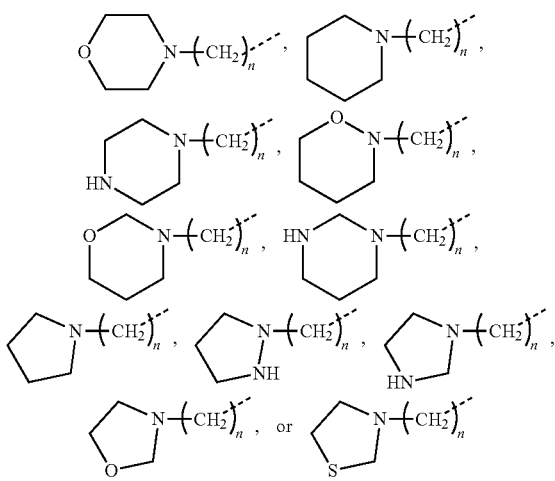

is optionally substituted by $C_{1-4}$ alkyl or phenyl.

5. The compound, the pharmaceutically acceptable salt or the stereoisomer thereof according to claim 1, wherein $R_2$ and $R_3$ are each independently OH, $C_{1-3}$ alkyl or $O(O)C_{1-3}$ alkyl, or $R_2$ and $R_3$ form a 6 to 10-membered ring

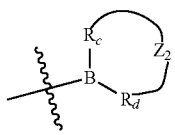

with the B atom to which they connect; the $R_c$ and $R_d$ are each independently O, S, —CO or —OS(O)$_2$; and the $Z_2$ is a $C_{1-5}$ hydrocarbon group, or a heterohydrocarbon group obtained by substituting 1-3 carbon atoms in the $C_{1-5}$ hydrocarbon group with a heteroatom selected from the group consisting of O, S or N.

6. The compound, the pharmaceutically acceptable salt or the stereoisomer thereof according to claim 1, wherein $R_2$ and $R_3$ are each independently OH, $C_{1-3}$ alkyl or O(O)C$_{1-3}$ alkyl, or $R_2$ and $R_3$ form the follows with the connected B atoms:

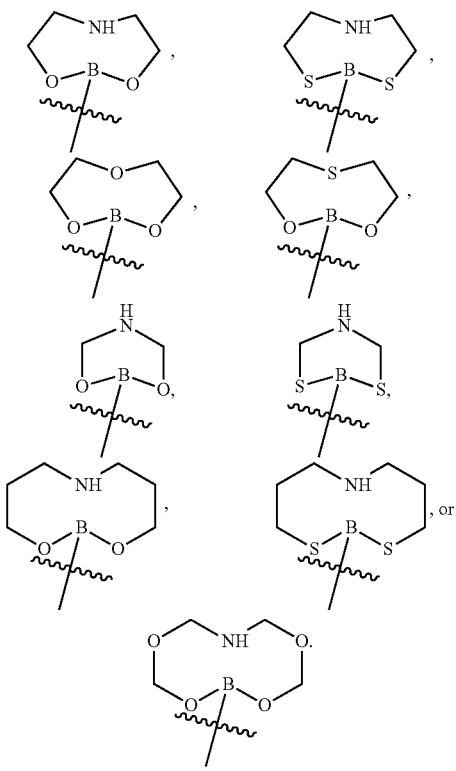

7. The compound, the pharmaceutically acceptable salt or the stereoisomer thereof according to claim 1, wherein $R_4$ is $C_{1-4}$ alkyl, phenyl, halogenated phenyl, $C_{1-4}$ haloalkyl phenyl, $C_{1-4}$ alkyl phenyl, cyanophenyl, $C_{1-4}$ alkoxyphenyl, biphenyl, $C_{1-4}$ alkylsulfonyl phenyl, phenyl $C_{1-4}$ alkoxyphenyl, or a 5-membered or 6-membered unsaturated heterocyclyl containing 1-3 heteroatoms selected from the group consisting of N or O or S.

8. The compound, the pharmaceutically acceptable salt or the stereoisomer thereof according to claim 1, wherein $R_4$ is $C_{1-4}$ alkyl, phenyl, fluorophenyl, chlorophenyl, bromophenyl, $C_{1-4}$ fluoroalkyl phenyl, $C_{1-4}$ chloroalkyl phenyl, $C_{1-4}$ bromoalkyl phenyl, $C_{1-4}$ alkyl phenyl, cyanophenyl, $C_{1-4}$ alkoxyphenyl, biphenyl, $C_{1-4}$ alkylsulfonyl phenyl, phenyl $C_{1-4}$ alkoxyphenyl, or a 5-membered or 6-membered unsaturated heterocyclyl containing 1-2 heteroatoms selected from the group consisting of N or O or S.

9. The compound, the pharmaceutically acceptable salt or the stereoisomer thereof according to claim 1, wherein $R_4$ is $C_{1-4}$ alkyl, phenyl, fluorophenyl, chlorophenyl, bromophenyl, $C_{1-4}$ fluoroalkyl phenyl, $C_{1-4}$ chloroalkyl phenyl, $C_{1-4}$ bromoalkyl phenyl, $C_{1-4}$ alkyl phenyl, cyanophenyl, $C_{1-4}$ alkoxyphenyl, biphenyl, $C_{1-4}$ alkylsulfonyl phenyl, phenyl $C_{1-4}$ alkoxyphenyl,

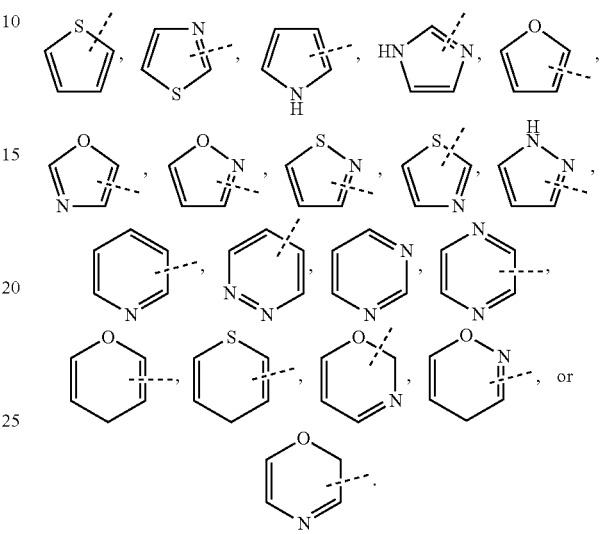

10. The compound, the pharmaceutically acceptable salt or the stereoisomer thereof according to claim 1, wherein $R_1$ is H, fluoromethylphenyl, chloromethylphenyl, bromomethylphenyl, fluoroethylphenyl, chloroethylphenyl, chloroethylphenyl, bromoethylphenyl, fluoropropylphenyl, chloropropylphenyl, bromopropylphenyl, fluorophenyl, chlorophenyl, bromophenyl, methylphenyl, ethylphenyl, propylphenyl,

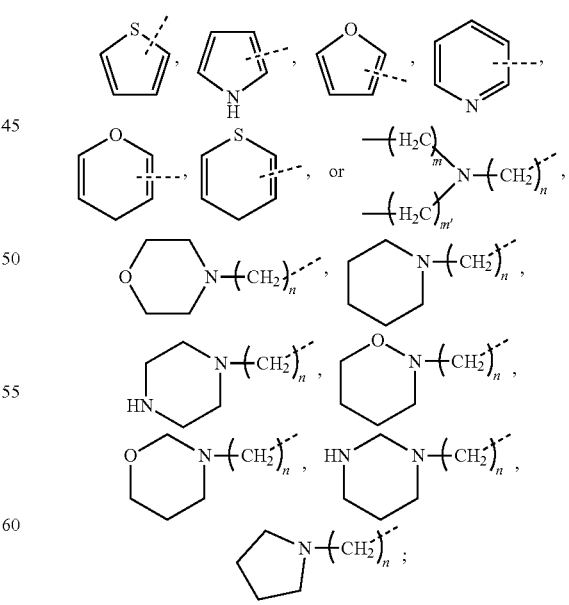

n is an integer selected from the group consisting of 1-5, m and m' are the same or different and are each independently an integer selected from the group consisting of 0-2; and

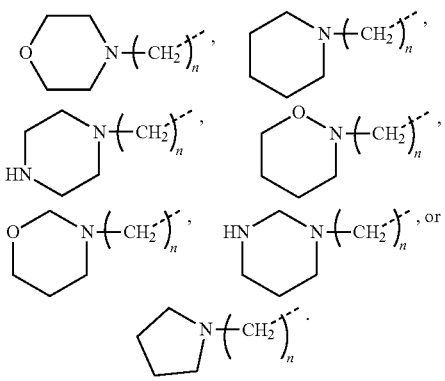

is optionally substituted by methyl, ethyl, propyl or phenyl;

R$_2$ and R$_3$ are each independently OH, or R$_2$ and R$_3$ form

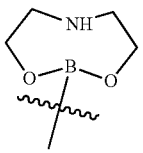 [SMILES: *B1OCCNCCO1]

with the B atom to which they connect;

R$_4$ is methyl, ethyl, propyl, phenyl, fluorophenyl, chlorophenyl, bromophenyl, cyanophenyl, methylphenyl, ethylphenyl, propylphenyl, methoxyphenyl, ethoxyphenyl, propoxyphenyl, biphenyl, methylsulfonylphenyl, ethylsulfonylphenyl, propylsulfonylphenyl, phenylmethoxyphenyl, phenylethoxyphenyl, phenylpropoxyphenyl,

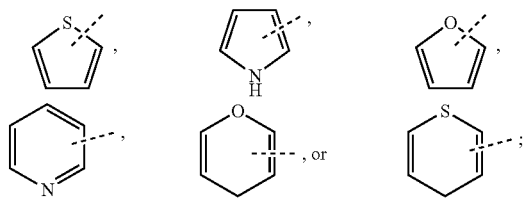

X is O, S, —OS(O)$_2$—, or —NHS(O)$_2$—.

11. The compound, the pharmaceutically acceptable salt or the stereoisomer thereof according to claim 1, wherein the compound is:

(1) (R)-3-methyl-1-(2-(5-phenyl-3-(2-(((3-(trifluoromethyl)phenyl)sulfonyl)oxy)phenyl)-1H-pyrazol-1-yl)acetamido)butyl)boronic acid;

(2) (R)-3-methyl-1-(2-(5-phenyl-3-(2-(((4-(trifluoromethyl)phenyl)sulfonyl)oxy)phenyl)-1H-pyrazol-1-yl)acetamido)butyl)boronic acid;

(3) (R)-3-methyl-1-(2-(5-phenyl-3-(2-(((2-(trifluoromethyl)phenyl)sulfonyl)oxy)phenyl)-1H-pyrazol-1-yl)acetamido)butyl)boronic acid;

(4) (R)-1-(2-(3-(2-(((3-fluorophenyl)sulfonyl)oxy)phenyl)-5-phenyl-1H-pyrazol-1-yl)-acetamido)-3-methylbutyl)boronic acid;

(5) (R)-1-(2-(3-(2-(((3-chlorophenyl)sulfonyl)oxy)phenyl)-5-phenyl-1H-pyrazol-1-yl)-acetamido)-3-methylbutyl)boronic acid;

(6) (R)-1-(2-(3-(2-(((3-bromophenyl)sulfonyl)oxy)phenyl)-5-phenyl-1H-pyrazol-1-yl)-acetamido)-3-methylbutyl)boronic acid;

(7) (R)-1-(2-(3-(2-(((2,5-dichlorophenyl)sulfonyl)oxy)phenyl)-5-phenyl-1H-pyrazol-1-yl)-acetamido)-3-methylbutyl)boronic acid;

(8) (R)-3-methyl-1-(2-(5-phenyl-3-(2-((m-tolylsulfonyl)oxy)phenyl)-1H-pyrazol-1-yl)acetamido)butyl)boronic acid;

(9) (R)-3-methyl-1-(2-(5-phenyl-3-(2-((thiophen-2-ylsulfonyl)oxy)phenyl)-1H-pyrazol-1-yl)acetamido)butyl)boronic acid;

(10) (R)-1-(2-(3-(2-((pyridin-2-ylsulfonyl)oxy)phenyl)-5-phenyl-1H-pyrazol-1-yl)acetamido)-3-methylbutyl)boronic acid;

(11) (R)-3-methyl-1-(2-(5-phenyl-3-(3-(((3-(trifluoromethyl)phenyl)sulfonyl)oxy)phenyl)-1H-pyrazol-1-yl)acetamido)butyl)boronic acid;

(12) (R)-3-methyl-1-(2-(5-phenyl-3-(4-(((3-(trifluoromethyl)phenyl)sulfonyl)oxy)phenyl)-1H-pyrazol-1-yl)acetamido)butyl)boronic acid;

(13) (R)-1-(2-(5-(4-bromophenyl)-3-(2-(((3-(trifluoromethyl)phenyl)sulfonyl)oxy)phenyl)-1H-pyrazol-1-yl)acetamido)-3-methylbutyl)boronic acid;

(14) (R)-1-(2-(5-(3-bromophenyl)-3-(2-(((3-(trifluoromethyl)phenyl)sulfonyl)oxy)phenyl)-1H-pyrazol-1-yl)acetamido)-3-methylbutyl)boronic acid;

(15) (R)-1-(2-(5-(2-bromophenyl)-3-(2-(((3-trifluoromethylphenyl) sulfonyl)oxy)phenyl)-1H-pyrazol-1-yl)acetamido)isobutyl)boronic acid;

(16) (R)-1-(2-(5-(4-fluorophenyl)-3-(2-(((3-(trifluoromethyl)phenyl)sulfonyl)oxy)phenyl)-1H-pyrazol-1-yl)acetamido)-3-methylbutyl)boronic acid;

(17) (R)-1-(2-(5-(4-chlorophenyl)-3-(2-(((3-(trifluoromethyl)phenyl)sulfonyl)oxy)phenyl)-1H-pyrazol-1-yl)acetamido)-3-methylbutyl)boronic acid;

(18) (R)-1-(2-(5-(4-cyanophenyl)-3-(2-(((3-(trifluoromethyl)phenyl)sulfonyl)oxy)phenyl)-1H-pyrazol-1-yl)acetamido)-3-methylbutyl)boronic acid;

(19) (R)-1-(2-(5-(4-(methylsulfonyl)phenyl)-3-(2-(((3-(trifluoromethyl)phenyl)sulfonyl)oxy)phenyl)-1H-pyrazol-1-yl)acetamido)-3-methylbutyl)boronic acid;

(20) (R)-1-(2-(5-(4-methyl-phenyl)-3-(2-(((3-trifluoromethylphenyl) sulfonyl)oxy)phenyl)-1H-pyrazol-1-yl)acetamido)isobutyl)boronic acid;

(21) (R)-1-(2-(5-(4-methoxyphenyl)-3-(2-(((3-(trifluoromethyl)phenyl)sulfonyl)oxy)phenyl)-1H-pyrazol-1-yl)acetamido)-3-methylbutyl)boronic acid;

(22) (R)-1-(2-(5-([1,1'-biphenyl]-4-yl)-3-(2-(((3-(trifluoromethyl)phenyl)sulfonyl)oxy)phenyl)-1H-pyrazol-1-yl)acetamido)-3-methylbutyl)boronic acid;

(23) (R)-1-(2-(5-(4-(benzyloxy)phenyl)-3-(2-(((3-(trifluoromethyl)phenyl)sulfonyl)oxy)phenyl)-1H-pyrazol-1-yl)acetamido)-3-methylbutyl)boronic acid;

(24) (R)-1-(2-(5-(furan-2-yl)-3-(2-(((3-(trifluoromethyl)phenyl)sulfonyl)oxy)phenyl)-1H-pyrazol-1-yl)acetamido)-3-methylbutyl)boronic acid;

(25) (R)-3-methyl-1-(2-(5-(thiophen-2-yl)-3-(2-(((3-(trifluoromethyl)phenyl)sulfonyl)oxy)phenyl)-1H-pyrazol-1-yl)acetamido)butyl)boronic acid;

(26) (R)-3-methyl-1-(2-(5-methyl-3-(3-(((3-trifluoromethylphenyl) sulfonamido)phenyl)-1H-pyrazol-1-yl)acetamido)isobutyl)boronic acid;

(27) (R)-1-(2-(3-(3-hydroxyphenyl)-5-phenyl-1H-pyrazol-1-yl)acetamido) 3-methylbutyl)boronic acid;

(28) (R)-(3-methyl-1-(2-(5-phenyl-3-(3-((3-(trifluoromethyl)phenyl)sulfonyl)oxy)phenyl)-1H-pyrazol-1-yl)acetamido)butyl)boronic acid;
(29) (R)-(1-(2-(3-(3-(2-(dimethylamino) ethoxy)phenyl)-5-phenyl-1H-pyrazol-1-yl)acetamido)-3-methylbutyl) boronic acid hydrochloride;
(30) (R)-(3-methyl-1-(2-(3-(3-(2-morpholinoethoxy)phenyl)-5-phenyl-1H-pyrazol-1-yl)-acetamido)butyl) boronic acid hydrochloride;
(31) (R)-(3-methyl-1-(2-(3-(3-(3-morpholinopropoxy)phenyl)-5-phenyl-1H-pyrazol-1-yl)acetamido)butyl) boronic acid hydrochloride;
(32) (R)-(1-(2-(3-(N,N-diethylethoxy)phenyl)-5-phenyl-1H-pyrazol-1-yl)acetamido)isobutyl)boronic acid hydrochloride;
(33) (R)-(3-methyl-1-(2-(5-phenyl-3-(3-(2-(pyrrolidin-1-yl)ethoxy)phenyl)-1H-pyrazol-1-yl)acetamido) isobutyl)boronic acid hydrochloride;
(34) (R)-(3-methyl-1-(2-(5-phenyl-3-(3-(2-(piperidin-1-yl)ethoxy)phenyl)-1H-pyrazol-1-yl)acetamido) isobutyl)boronic acid hydrochloride;
(35) (R)-(3-methyl-1-(2-(3-(3-(2-(4-methylpiperazin-1-yl)ethoxy)phenyl)phenyl)-5-phenyl-1H-pyrazol-1-yl) acetamido)butyl)boronic acid hydrochloride;
(36) ((1R)-1-(2-(3-(3-(2-(2,6-dimethylmorpholino) ethoxy)phenyl)-5-phenyl-1H-pyrazol-1-yl)acetamido)-3-methylbutyl)boronic acid hydrochloride;
(37) ((1R)-1-(2-(3-(3-(2-(S,S-2,6-dimethylmorpholino) ethoxy)phenyl)-5-phenyl-1H-pyrazol-1-yl)acetamido)-3-methylbutyl)boronic acid hydrochloride;
(38) ((1R)-1-(2-(3-(3-(2-(S,R-2,6-dimethylmorpholino) ethoxy)phenyl)-5-phenyl-1H-pyrazol-1-yl)acetamido)-3-methylbutyl)boronic acid hydrochloride;
(39) (R)-(3-methyl-1-(2-(5-phenyl-3-(3-(2-(4-phenylpiperazin-1-yl)ethoxy)phenyl)-1H-pyrazol-1-yl)acetamido)butyl)boronic acid hydrochloride;
(40) (R)-(3-methyl-1-(2-(5-phenyl-3-(3-(3-(4-phenylpiperazin-1-yl)propoxy)phenyl)-1H-pyrazol-1-yl)acetamido)butyl)boronic acid dihydrochloride;
(41) (R)-(3-methyl-1-(2-(5-phenyl-3-(3-(4-(4-phenylpiperazin-1-yl)butoxy)phenyl)-1H-pyrazol-1-yl)acetamido)butyl)boronic acid dihydrochloride; or
(42) (R)-(3-methyl-1-(2-(5-phenyl-3-(3-((5-(4-phenylpiperazin-1-yl)pentyl)oxy)phenyl)-1H-pyrazol-1-acyl)acetamido)butyl)boronic acid dihydrochloride.

12. A pharmaceutical composition comprising the compound, the pharmaceutically acceptable salt or the stereoisomer thereof according to claim 1, and a pharmaceutically acceptable excipient.

13. The pharmaceutical composition according to claim 12, wherein the pharmaceutically acceptable excipient is solvent, propellant, solubilizer, cosolvent, emulsifier, colorant, disintegrant, filler, lubricant, wetting agent, osmotic pressure regulator, stabilizer, glidant, flavoring agent, preservative, suspending agent, antioxidant, penetration enhancer, pH regulator, surfactant, or diluent.

14. A method of treating or alleviating a proteasome-related disease comprising administering to a subject in need thereof a therapeutically effective amount of the compound, the pharmaceutically acceptable salt or the stereoisomer thereof according to claim 1, or a pharmaceutical composition comprising the same.

15. The method according to claim 14, wherein proteasome-related disease is tumor, plasmodium infection, asthma, or Alzheimer's disease.

* * * * *